US011702486B2

(12) United States Patent
Laskowski et al.

(10) Patent No.: US 11,702,486 B2
(45) Date of Patent: Jul. 18, 2023

(54) HYDROCARBON POLYMERS CONTAINING AMMONIUM FUNCTIONALITY

(71) Applicants: 3M Innovative Properties Company, St. Paul, MN (US); Alliance for Sustainable Energy, LLC, Golden, CO (US)

(72) Inventors: Carl A. Laskowski, Minneapolis, MN (US); Michael A. Yandrasits, Hastings, MN (US); Timothy M. Gillard, St. Paul, MN (US); Zbyslaw R. Owczarczyk, Littleton, CO (US); Marina M. Kaplun, Woodbury, MN (US)

(73) Assignees: 3M Innovative Properties Company, St. Paul, MN (US); Alliance for Sustainable Energy, LLC, Golden, CO (US)

(*) Notice: Subject to any disclaimer, the term of this patent is extended or adjusted under 35 U.S.C. 154(b) by 186 days.

(21) Appl. No.: 16/980,312

(22) PCT Filed: Mar. 11, 2019

(86) PCT No.: PCT/US2019/021584
§ 371 (c)(1),
(2) Date: Sep. 11, 2020

(87) PCT Pub. No.: WO2019/177953
PCT Pub. Date: Sep. 19, 2019

(65) Prior Publication Data
US 2021/0079131 A1 Mar. 18, 2021

Related U.S. Application Data

(60) Provisional application No. 62/641,773, filed on Mar. 12, 2018.

(51) Int. Cl.
| | |
|---|---|
| *C08F 8/32* | (2006.01) |
| *C08F 8/04* | (2006.01) |
| *C08F 8/44* | (2006.01) |
| *C08F 236/06* | (2006.01) |
| *C08F 297/04* | (2006.01) |
| *C08K 5/50* | (2006.01) |
| *C08L 53/02* | (2006.01) |
| *H01M 8/1004* | (2016.01) |

(52) U.S. Cl.
CPC .......... *C08F 8/32* (2013.01); *C08F 8/04* (2013.01); *C08F 8/44* (2013.01); *C08F 236/06* (2013.01); *C08F 297/04* (2013.01); *C08K 5/50* (2013.01); *C08L 53/025* (2013.01); *H01M 8/1004* (2013.01)

(58) Field of Classification Search
CPC ...... C08F 8/04; C08F 8/32; C08F 8/30; C08F 36/06; C08F 236/06
See application file for complete search history.

(56) References Cited

U.S. PATENT DOCUMENTS

| | | | |
|---|---|---|---|
| 4,503,217 A | 3/1985 | Alexander et al. | |
| 4,558,101 A | 12/1985 | Jachimowicz et al. | |
| 4,657,984 A * | 4/1987 | McEntire | C08C 19/22 525/333.1 |
| 5,382,629 A | 1/1995 | Coran et al. | |
| 5,434,309 A * | 7/1995 | McGrath | C08C 19/34 525/333.2 |
| 5,559,193 A | 9/1996 | McGrath et al. | |
| 6,103,676 A * | 8/2000 | Coolbaugh | C08C 19/22 585/12 |
| 6,248,798 B1 | 6/2001 | Slingsby et al. | |
| 7,589,081 B2 | 9/2009 | Zapf et al. | |
| 8,748,330 B2 | 6/2014 | Debe et al. | |
| 8,927,776 B2 | 1/2015 | Franke et al. | |
| 9,493,397 B2 | 11/2016 | Coates et al. | |
| 2005/0215825 A1 | 9/2005 | Briggs et al. | |
| 2009/0156699 A1 | 6/2009 | MacDonald et al. | |
| 2010/0137460 A1 | 6/2010 | Bert et al. | |
| 2012/0035280 A1 | 2/2012 | Jikihara et al. | |
| 2013/0296499 A1 | 11/2013 | Coates et al. | |
| 2014/0107237 A1 | 4/2014 | Yan et al. | |
| 2016/0367980 A1 | 12/2016 | Inomata et al. | |
| 2017/0174800 A1 | 6/2017 | Isomura et al. | |

FOREIGN PATENT DOCUMENTS

| | | | |
|---|---|---|---|
| EP | 0603146 A1 | 6/1994 | |
| JP | 2004346140 A | 12/2004 | |
| JP | 2009173898 A | 8/2009 | |
| WO | WO-0006618 A1 * | 2/2000 | ............... C08F 8/04 |
| WO | 2016/168468 A2 | 10/2016 | |
| WO | 2017/109429 A1 | 6/2017 | |

OTHER PUBLICATIONS

McGrath, et al., "Functionalization of Polymers by Metal-Mediated Processes", 1995, Chem. Rev., 95:381-398.
Tremont, et al., "Hydroformylation of 1,2- and 1,4-Polybutadiene and Their Mixtures with Hydridocarbonyltris (triphenylphosphine)rhodium(I) Catalyst and Excess Triphenylphosphine", 1990, Macromolecules, 23:1984-1993.
Ndoni et al., "Laboratory-scale setup for anionic polymerization under inert atmosphere", Feb. 1995, Rev. Sci. Instrum., 66(2):1090-1095.
Wu, et al., "Efficient and Regioselective Ruthenium-catalyzed Hydroaminomethylation of Olefins", Feb. 18, 2013, J. Am. Chem. Soc., 135(10):3989-3996.
Wu, et al., "Ruthenium-Catalyzed Hydroformylation/Reduction of Olefins to Alcohols: Extending the Scope to Internal Alkenes", Aug. 29, 2013, J. Am. Chem. Soc., 135:14306-14312.
Zhang, et al., "Facilitating Anion Transport in Polyolefin-Based Anion Exchange Membranes via Bulky Side Chains" Aug. 16, 2016, ACS Appl. Mater. Interfaces, 8:23321-23330.

(Continued)

*Primary Examiner* — Robert C Boyle
(74) *Attorney, Agent, or Firm* — Mueting Raasch Group

(57) ABSTRACT

Described herein are cationic polymers having a plurality of quaternary amino groups, methods of making such polymers, and uses of such polymers as ion exchange membranes in electrochemical devices.

15 Claims, No Drawings

(56) References Cited

OTHER PUBLICATIONS

Zhang, et al., "Highly stable anion exchange membranes based on quaternized polypropylene", Apr. 30, 2015, J. Mater. Chem. A, 3:12284-12296.

Zhang, et al., "New Polyethylene Based Anion Exchange Membranes (PE-AEMs) with High Ionic Conductivity", Jul. 14, 2011, Macromolecules, 44:5937-5946.

Zhu, et al., "Multication Side Chain Anion Exchange Membranes", Macromolecules, Jan. 25, 2016, 49:815-824.

International Patent Application No. PCT/US2019/021584 filed Mar. 11, 2019, International Search Report and Written Opinion, dated Jun. 4, 2019, 9 pages.

Zhu, et al., "Exploring backbone-cation alkyl spacers for multication side chain anion exchange membranes", 2018, Journal of Power Sources, 375:433-441. Available online Jun. 16, 2017.

International Patent Application No. PCT/US2019/021584 filed Mar. 11, 2019, International Preliminary Report on Patentability, dated Sep. 15, 2020, 6 pages.

\* cited by examiner

HYDROCARBON POLYMERS CONTAINING AMMONIUM FUNCTIONALITY

CROSS REFERENCE TO RELATED APPLICATION

This application is the § 371 U.S. National Stage of International Application No. PCT/US2019/021584, filed Mar. 11, 2019, which claims the benefit of U.S. Provisional Patent Application No. 62/641,773, filed Mar. 12, 2018, the disclosures of which are incorporated by reference herein in their entireties.

GOVERNMENT RIGHTS

This United States government has rights in this invention under Contract No. DE-AC36-08GO28308 between the United States Department of Energy and the Alliance for Sustainable Energy, LLC, the Manager and Operator of the National Renewable Energy Laboratory. This invention was made with Government support under Contract No. DE-EE0000776 awarded by DOE. The Government has certain rights in this invention.

TECHNICAL FIELD

Membranes for electrochemical devices are disclosed.

BACKGROUND

The successful commercialization of base-stable anion exchange membranes has yet to be realized due to the difficulty in (i) obtaining a polyelectrolyte capable of withstanding highly basic media (pH>14) for extended periods of time without degradation and (ii) having sufficiently low membrane ionic resistance to allow for high efficiency in a cell. The interest to develop durable anion exchange membranes (AEM) over proton exchange membranes (PEM) results from the cost-advantage in metal catalysts used in an AEM versus a PEM fuel cell and electrolyzer technology, and related electrochemical applications.

SUMMARY

There is a desire to prepare cationic polymers having a plurality of quaternary amino groups, that can be used to make solid, polymeric membranes, including membranes that can be used as polymeric anion exchange membranes with high charge densities and good durability in highly basic media. To that end, the instant disclosure relates to:

A method of making a hydrogenated nitrogen-containing copolymer, the method comprising:
  obtaining or providing a precursor copolymer that is a polymerized product of a monomer composition comprising butadiene, wherein the precursor copolymer is a random or block copolymer comprising
  1) a hydrocarbon backbone, wherein the hydrocarbon backbone has carbon-carbon double bonds; and
  2) unsaturated pendant groups *—CH=CH$_2$ attached to the hydrocarbon backbone, wherein the asterisk denotes the attachment site of the pendant group to the hydrocarbon backbone; and
  hydroformylating and reductively aminating the precursor copolymer in the presence of at least one transition metal catalyst to provide a first aminated copolymer, wherein the first aminated copolymer comprises 1) a hydrocarbon backbone, wherein the hydrocarbon backbone has carbon-carbon double bonds; and
  2) nitrogen-containing pendant groups attached to the hydrocarbon backbone, the nitrogen-containing pendant groups being of Formula (IA) and Formula (IB)

*—CH$_2$CH$_2$CH$_2$—NR$^1$R$^2$ (IA)

*—CH(CH$_3$)—CH$_2$—NR$^1$R$^2$ (IB)

wherein
    a) R$^1$ is hydrogen or alkyl and R$^2$ is an alkyl; or
    b) R$^1$ and R$^2$ together with the nitrogen to which they are both attached form a heterocyclic ring that is saturated, the heterocyclic ring optionally further comprising an oxygen heteroatom;
    wherein the molar ratio of pendant groups of Formula (IA) to pendant groups of Formula (IB) is at least 6; and
  hydrogenating the first aminated copolymer in the presence of a hydrogenation catalyst to provide a hydrogenated nitrogen-containing copolymer having pendant nitrogen-containing groups of Formula (IA) and (IB), wherein no more than 20 mole percent of the carbons in the hydrocarbon backbone are in double bonds.

A hydrogenated nitrogen-containing copolymer comprising:
  1) a hydrocarbon backbone, wherein no more than 20 mole percent of the carbons in the hydrocarbon backbone are in double bonds; and
  2) pendant groups attached to the hydrocarbon backbone of Formula (IA) and Formula (IB)

*—CH$_2$CH$_2$CH$_2$—NR$^1$R$^2$ (IA)

*—CH(CH$_3$)—CH$_2$—NR$^1$R$^2$ (IB)

wherein
  a) R$^1$ is hydrogen or alkyl and R$^2$ is an alkyl; or
  b) R$^1$ and R$^2$ together with the nitrogen to which they are both attached form a heterocyclic ring that is saturated, the heterocyclic ring optionally further comprising an oxygen heteroatom;
  wherein the molar ratio of pendant groups of Formula (IA) to pendant groups of Formula (IB) is at least 6.

A cationic copolymer comprising:
  1) a hydrocarbon backbone, wherein no more than 20 mole percent of the carbons in the hydrocarbon backbone are in double bonds; and
  2) pendant groups attached to the hydrocarbon backbone of Formula (IIA) and Formula (IIB)

*—CH$_2$CH$_2$CH$_2$—(NR$^3$R$^4$R$^5$)$^+$ (IIA)

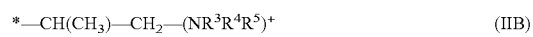

*—CH(CH$_3$)—CH$_2$—(NR$^3$R$^4$R$^5$)$^+$ (IIB)

wherein
  R$^3$ and R$^4$ are each an alkyl or R$^3$ and R$^4$ together with the nitrogen to which they are both attached form a heterocyclic ring that is saturated, the heterocyclic ring optionally further comprising an oxygen heteroatom;
  R$^5$ is an alkyl, a multi-cationic group of formula —R$^6$—[(N(R$^7$)$_2$$^+$—R$^6$]$_q$—[N(R$^8$)$_2$R$^9$]$^+$, or a multi-cationic group of formula —R$^6$—[N(R$^7$)$_2$$^+$—R$^6$]$_q$—[X$^1$(R$^{10}$)$_2$]$^+$;
    each R$^6$ is independently an alkylene;
    each R$^7$ is independently an alkyl;
    each R$^8$ is alkyl or both R$^8$ groups combine together with the nitrogen to which they are both attached to form a heterocyclic ring that is saturated, the heterocyclic ring optionally further comprising an oxygen heteroatom;

$R^9$ is an alkyl;

$X^1$ is CH or N;

both $R^{10}$ groups together with $X^1$ to which they are both attached form a heterocyclic ring that is saturated or unsaturated, wherein the heterocyclic ring further comprises a quaternary amino group;

q is an integer in a range of 0 to 3;

the molar ratio of pendant groups of Formula (IIA) to pendant groups of Formula (IIB) is at least 6; and each cationic group has an anionic counterion.

The above summary is not intended to describe each embodiment. The details of one or more embodiments of the invention are also set forth in the description below. Other features, objects, and advantages will be apparent from the description and from the claims.

DESCRIPTION

As used herein, the term "a", "an", and "the" are used interchangeably and mean one or more.

As used herein, an asterisk (*) in a formula for a group denotes the point of attachment of the group to a polymeric backbone.

As used herein, the symbol "∼∼∼" is used to indicate the point of attachment of a repeat unit within a polymeric material to another group within the polymeric material such as another repeat unit or to a terminal group.

The term "and/or" is used to indicate one or both stated cases may occur, for example A and/or B includes (A and B) and (A or B). Thus, the term can be used to mean A alone, B alone, or both A and B.

The term "ion exchange membrane" is a membrane comprising ion-containing polymers (also known as ion exchange resins) in which the ion-containing polymers are typically almost exclusively either cations or anions. The counterions of the polymers' charged functional groups are typically small, hydrophilic ions, which can migrate through the membrane polymer matrix, particularly under the influence of an electric field or a concentration gradient. If the ion exchange membrane contains cations, it can be referred to as an "anion exchange membrane".

The term "polymer" refers to a macrostructure having a number average molecular weight (Mn) of at least 5,000 Daltons, at least 10,000 Dalton, at least 25,000 Dalton, at least 50,000 Dalton, at least 100,000 Dalton, at least 300,000 Dalton, at least 500,000 Dalton, at least 750,000 Dalton, at least 1,000,000 Dalton, or even at least 1,500,000 Dalton and up to 3,000,000 Daltons, up to 2,000,000 Daltons, or up to 1,000,000 Daltons. The molecular weight can be determined by gel permeation chromatography. The term polymer can refer to homopolymers, copolymers, terpolymers, and the like. The polymer can be a random or block copolymer.

The term "polymer backbone" refers to the main continuous chain of the polymer. In many embodiments, the polymer backbone is a hydrocarbon chain.

As used herein, the term "alkyl" broadly refers to substituted or unsubstituted monovalent linear chain and branched alkyl groups, as well as cyclic alkyl groups, having from 1 to 40 carbon atoms, 1 to 30 carbon atoms, 1 to 12 carbons or, in some embodiments, from 8 to 30 carbon atoms, 12 to 20 carbon atoms, 16 to 30 carbon atoms, 1 to 8 carbon atoms, or 1 to 4 carbon atoms. Such alkyl groups may be substituted or unsubstituted. Examples of linear chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include those with from 1 to 8 carbon atoms such as isopropyl, iso-butyl, sec-butyl, t-butyl, neopentyl, isopentyl, and 2,2-dimethylpropyl groups. As used herein, the term "alkyl" encompasses n-alkyl, and isoalkyl groups as well as other branched chain forms of alkyl. Cyclic alkyl (i.e., cycloalkyl) groups have at least 3, at least 4, at least 5, or at least 6 carbon atoms. Examples of cycloalkyl groups include those with from 3 to 8 carbon atoms such as cyclopropyl, cyclobutyl, cyclopentyl, and cyclohexyl.

As used herein, the term "alkylene" broadly refers to substituted or unsubstituted divalent linear chain, branched, and cyclic alkylene (i.e., cycloalkylene) groups having from 1 to 40 carbon atoms ($C_1$-$C_{40}$), 1 to about 20 carbon atoms ($C_1$-$C_{20}$), 1 to 12 carbon atoms ($C_1$-$C_{12}$), 1 to 8 carbon atoms ($C_1$-$C_8$), 1 to 6 carbon atoms ($C_1$-$C_6$) or, in some examples, from 6 to 12 carbon atoms ($C_6$-$C_{12}$), 6 to 10 carbon atoms ($C_6$-$C_{10}$), 8 to 12 carbon atoms ($C_8$-$C_{12}$), 8 to 10 carbon atoms ($C_8$-$C_{10}$), 4 to 9 carbon atoms ($C_4$-$C_9$), 6 to 9 carbon atoms ($C_6$-$C_9$), and 6 to 8 carbon atoms ($C_6$-$C_8$). Cyclic alkylene have at least 3, at least 4, at least 5, or at least 6 carbon atoms. Examples of linear chain divalent alkylene groups include those having from 1 to 8 carbon atoms such as ethyl (—$CH_2CH_2$—), n-propyl (—$CH_2CH_2CH_2$—), n-butyl (—$CH_2CH_2CH_2CH_2$—), n-pentyl (—$CH_2CH_2CH_2CH_2CH_2$—), n-hexyl (—$CH_2CH_2CH_2CH_2CH_2CH_2$—), n-heptyl (—$CH_2CH_2CH_2CH_2CH_2CH_2CH_2$—), and n-octyl (—$CH_2CH_2CH_2CH_2CH_2CH_2CH_2CH_2$—) groups.

As used herein, the term "aryl" refers to monovalent substituted or unsubstituted cyclic aromatic hydrocarbons that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some examples, aryl groups contain about 6 to about 14 carbons ($C_6$-$C_{14}$) or from 6 to 10 carbon atoms ($C_6$-$C_{10}$) in the ring portions of the groups. Aryl groups can be unsubstituted or substituted, as defined herein.

As used herein, the term "substituted" broadly refers to a group (e.g., an alkyl group or an aryl group) in which at least one hydrogen atom contained therein is replaced by at least one "substituent." Examples of substituents include, but are not limited to: alkyl, halogen (e.g., F, Cl, Br, and I), and various oxygen-containing groups such as hydroxy groups, alkoxy groups, and aryloxy groups (the oxygen atom is typically the atom connected to the group that is substituted). One example is an aryl substituted by an alkyl, alkoxy, hydroxy, or halo. Another example is an alkyl substituted with an aryl, alkoxy, hydroxy, or halo.

As used herein, the term "units of 1,4-butadiene" refers to the following units incorporated into the precursor copolymer backbone.

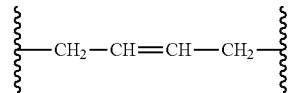

The double bond can be in a cis or trans configuration.

As used herein, the term "units of 1,2-butadiene" refers to the following units incorporated into the precursor copolymer backbone.

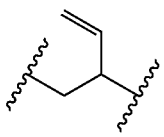 [SMILES: *CC(*)C=C]

As used herein, the terms "halo" or "halogen" or "halide," by themselves or as part of another substituent, mean, unless otherwise stated, a fluorine, chlorine, bromine, or iodine atom or ion.

As used herein, the term "leaving group" broadly refers to a group that can be displaced and replaced by a nucleophilic atom, such as a nitrogen atom. Examples of leaving groups include halogens (such as chlorine, bromine, and iodine) that are displaced as chloride, bromide, and iodide; and sulfonyl esters, such as mesyl, tosyl, and nosyl, which are displaced as mesylate, tosylate, and nosylate. While the leaving group can be any suitable leaving group, the leaving group is often bromine.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The term "about" as used herein can allow for a degree of variability in a value or range, for example, within 10%, within 5%, or within 1% of a stated value or of a stated limit of a range.

The present disclosure relates to cationic polymers having a plurality of quaternary amino groups that can be used to make solid, polymeric membranes, including membranes that can be used as polymeric anion exchange membranes. These membranes can have a charge density up to 5 milliequivalent per gram of membrane. The cationic polymers can be made via the corresponding hydrogenated nitrogen-containing copolymer. The corresponding hydrogenated nitrogen-containing copolymer can, in turn, be made by a method comprising:

obtaining or providing a precursor copolymer that is a polymerized product of a monomer composition comprising butadiene, wherein the precursor copolymer is a random or block copolymer comprising
1) a hydrocarbon backbone, wherein the hydrocarbon backbone has carbon-carbon double bonds;
2) unsaturated pendant groups *—CH=CH$_2$ attached to the hydrocarbon backbone, wherein the asterisk denotes the attachment site of the pendant group to the hydrocarbon backbone; and hydroformylating and reductively aminating the precursor copolymer in the presence of at least one transition metal catalyst to provide a first aminated copolymer, wherein the first aminated copolymer comprises
1) a hydrocarbon backbone, wherein the hydrocarbon backbone has carbon-carbon double bonds;
2) nitrogen-containing pendant groups attached to the hydrocarbon backbone, the nitrogen-containing pendant groups being of Formula (IA) and Formula (IB)

 (IA)

 (IB)

wherein
a) $R^1$ is hydrogen or alkyl and $R^2$ is an alkyl; or
b) $R^1$ and $R^2$ together with the nitrogen to which they are both attached form a heterocyclic ring that is saturated, the heterocyclic ring optionally further comprising an oxygen heteroatom;
wherein the molar ratio of pendant groups of Formula (IA) to pendant groups of Formula (IB) is at least 6; and hydrogenating the first aminated copolymer in the presence of a hydrogenation catalyst to provide a hydrogenated nitrogen-containing copolymer having pendant nitrogen-containing groups of Formula (IA) and (IB), wherein no more than 20 mole percent of the carbons in the hydrocarbon backbone are in double bonds.

The precursor copolymer comprises repeat units having the unsaturated pendant groups in an amount of about 5 to about 40 mole percent (e.g., 5 to 40 mole percent) based on total moles of repeat units in the precursor copolymer. This amount can be at least 10 mole percent, at least 15 mole percent, at least 20 mole percent, at least 25 mole percent and up to 40 mole percent, up to 35 mole percent, up to 30 mole percent, or up to 25 mole percent. In some examples, the precursor copolymer comprises repeat units having the unsaturated pendant groups in an amount of about 5 to about 25, about 10 to about 20, about 15 to about 30, about 10 to about 25, or about 25 to about 35 mole percent based on total moles of repeat units in the precursor copolymer.

The precursor copolymer can include repeat units of 1,4-butadiene and/or styrene. The amount of these repeat units can be in an amount of about 60 to about 95 mole percent (e.g., 60 to 95 mole percent) based on total moles of repeat units in the precursor copolymer. This amount can be at least 65 mole percent, at least 70 mole percent, at least 75 mole percent, at least 80 mole percent and up to 95 mole percent, up to 90 mole percent, up to 85 mole percent, or up to 80 mole percent based on total mole of repeat units.

The precursor copolymer can be a random copolymer or a block copolymer. The precursor copolymer can be a random copolymer comprising repeat units of 1,4-butadiene and 1,2-butadiene wherein the repeat units of 1,2-butadiene have the unsaturated pendant groups . Alternatively, the precursor copolymer can be a block copolymer. Many different types of block copolymers are possible. The block copolymer has at least one block that has repeat units of 1,2-butadiene with the unsaturated pendant groups *—CH=CH$_2$.

In one embodiment, the precursor block copolymer comprises:
at least one polybutadiene block that includes 1,2-butadiene repeat units and optionally 1,4-butatdiene repeat units; and
at least one second polystyrene-type block that includes repeat units of styrene, alpha-methyl styrene, t-butyl styrene, or a mixture thereof.

In another embodiment, the precursor block copolymer comprises:
at least one first polybutadiene block (an A block), wherein at least about 80 mole percent (e.g., at least about 85, at least about 90, at least about 95 or more; about 80 to about 90, about 85 to about 99, about 90 to about 99 or about 95 to about 100 mole percent) of the repeat units are 1,4-butadiene based on total moles of repeat units in the first polybutadiene block; and
at least one second polybutadiene block (a B block), wherein at least about 50 mole percent (e.g., at least about 60, at least about 70, at least about 80, at least about 90 or more; about 50 to about 90, about 60 to about 95, about 70 to about 90, about 80 to about 95 or about 95 to about 100 mole percent) of the repeat units are 1,2-butadiene based on total moles of repeat units in the second polybutadiene block. Such block copolymers can be, for example, ABA block copolymers, AB block copolymers, or BAB block copolymers.

In another embodiment, the precursor block copolymer comprises:

at least one polybutadiene block (a B block), wherein at least about 50 mole percent (e.g., at least about 60, at least about 70, at least about 80, at least about 90 or more; about 50 to about 90, about 60 to about 95, about 70 to about 90, about 80 to about 95 or about 95 to about 100 mole percent) of the repeat units are 1,2-butadiene based on total moles of repeat units in the polybutadiene block; and at least one polystyrene block (a C block), where at least about 80 mole percent (e.g., at least about 85, at least about 90, at least about 95 or more; about 80 to about 90, about 85 to about 99, about 90 to about 99 or about 95 to about 100 mole percent) of the repeat units are derived from a styrene-type monomer based on total moles of repeat units in the polystyrene block. Such block copolymers can be, for example, CB, CBC, or BCB block copolymers.

In yet another embodiment, the precursor copolymer comprises:

at least one butadiene block (D block) that includes a mixture of 1,2-butadiene repeat units and 1,4-butadiene repeat units with the amount of 1,2-butadiene repeat units being in a range from 5 to 40 mole percent (e.g., the amount of the 1,2-butadiene repeat units can be at least 10 mole percent, at least 15 mole percent, at least 20 mole percent, or at least 25 mole percent and up to 35 mole percent, up to 30 mole percent, or up to 25 mole percent) and the amount of 1,4-butadiene repeat units being in a range from 60 to 95 mole percent (e.g., the amount of the 1,4-butadiene repeat units can be at least 65 mole percent, at least 70 mole percent, or at least 75 mole percent and can be up to 90 mole percent, up to 85 mole percent, up to 80 mole percent, or up to 75 mole percent) based on total moles of repeat units in the butadiene block; and at least one polystyrene block (a C block), where at least about 80 mole percent (e.g., at least about 85, at least about 90, at least about 95 or more; about 80 to about 90, about 85 to about 99, about 90 to about 99, or about 95 to about 100 mole percent) of the repeat units are derived from a styrene-type monomer based on total moles of repeat units in the polystyrene block. Such block copolymers can be, for example, CD, CDC, or DCD block copolymers.

In yet another embodiment, the precursor block copolymer comprises:

at least one first polybutadiene block (an A block), wherein at least about 80 mole percent (e.g., at least about 85, at least about 90, at least about 95 or more; about 80 to about 90, about 85 to about 99, about 90 to about 99, or about 95 to about 100 mole percent) of the repeat units are 1,4-butadiene based on total moles of repeat units in the first polybutadiene block; and at least one second polybutadiene block (a B block), wherein at least about 50 mole percent (e.g., at least about 60, at least about 70, at least about 80, at least about 90 or more; about 50 to about 90, about 60 to about 95, about 70 to about 90, about 80 to about 95, or about 95 to about 100 mole percent) of the repeat units are 1,2-butadiene based on total moles of repeat units in the second polybutadiene block; and at least one polystyrene block (a C block), where at least about 80 mole percent (e.g., at least about 85, at least about 90, at least about 95 or more; about 80 to about 90, about 85 to about 99, about 90 to about 99 or about 95 to about 100 mole percent) of the repeat units are derived from a styrene-type monomer based on total moles of repeat units in the polystyrene block. Such block copolymers can be, for example, ABC, ACB, CAB, CABC, CABAC, ABCBA, ACAB, CACB, BCBA, CBCA or ACBCA block copolymers.

Although the precursor copolymer can be a random copolymer comprising repeat units of 1,4-butadiene and 1,2-butadiene, it can further comprise styrene-type repeat units comprising styrene repeat units, alpha-methyl styrene repeat units, or a mixture thereof. The styrene-type repeat units are based on styrene or alpha-methyl styrene and are of either of the following formulas.

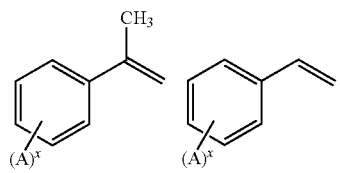

In these formulas, A is an optional alkyl and the variable x is an integer in a range from 0 to 2. That is, the aromatic ring optionally can be substituted with up to two alkyl groups. Any alkyl group substituent has 1 to 6 carbon atoms, 1 to 4 carbon atoms, or 1 to 3 carbon atoms. The alkyl group is often methyl or t-butyl.

Accordingly, the precursor copolymer can comprise from about 0 to about 75 mole percent styrene-type monomer. The amount can be at least 5 mole percent, at least 10 mole percent, at least 15 mole percent, at least 20 mole percent, at least 25 mole percent, at least 30 mole percent, at least 35 mole percent, at least 40 mole percent, at least 45 mole percent, or at least 50 mole percent and no more than 70 mole percent, no more than 65 mole percent, no more than 60 mole percent, no more than 55 mole percent, no more than 50 mole percent, or no more than 40 mole percent. For example, the amount can be in a range from about 10 to about 60 mole percent, about 30 to about 70 mole percent, about 25 to about 50 mole percent, about 50 to about 75 mole percent, or about 40 to about 70 mole percent styrene-type repeat units based on total moles of repeat units in the precursor copolymer.

As mentioned herein, the precursor copolymer can also be a block copolymer comprising a first polybutadiene block comprising repeat units of 1,4-butadiene and 1,2-butadiene and a second polystyrene-type block.

According to the methods described herein, the precursor copolymer is hydroformylated and reductively aminated. The hydroformylating and reductively aminating comprises:

forming a reaction mixture comprising:

a) the precursor copolymer dissolved in an organic solvent;

b) an amine compound of formula $NHR^1R^2$;

c) at least one first transition metal catalyst;

d) an optional phosphine compound; and exposing the reaction mixture to a gaseous mixture of carbon monoxide and hydrogen. The product is the first aminated copolymer.

In the pendant groups of the Formula (IA) and (IB) and in the amine compound of formula $NHR^1R^2$, groups $R^1$ and $R^2$ can both be alkyl or together with the nitrogen to which they are attached form a heterocyclic ring, wherein the heterocyclic ring is saturated and optionally further comprising an oxygen heteroatom. For example, $R^1$ and $R^2$ together with the nitrogen to which they are attached form a 5 or 6 membered heterocyclic ring such as pyrrolidinyl, piperidinyl, piperazinyl, or morpholinyl.

The method for making the hydrogenated nitrogen-containing copolymer can give a molar ratio of the pendant groups of Formula (IA) to pendant groups of Formula (IB) of at least about 6 (e.g., at least about 10, at least about 15, at least about 25, at least about 35, at least about 50, at least about 100 or at least about 500). The molar ration can be, for example, in a range from about 15 to about 50, from about 30 to about 100, or from about 80 to about 500.

The precursor copolymer can be dissolved in any suitable organic solvent or mixture of solvents. Examples of suitable solvents include tetrahydrofuran, alkanols (e.g., methanol, ethanol, or isopropanol), and aromatic solvents (e.g., benzene, toluene, and xylenes) and mixtures thereof.

The hydroformylation and reductive amination can be carried out in the presence of at least one first transition metal catalyst, of which at least one is a ruthenium catalyst or a rhodium catalyst. For example, the ruthenium catalyst can be a ruthenium carbonyl catalyst such as $Ru_3(CO)_{12}$. The rhodium catalyst can be a rhodium carbonyl catalyst such as $(acac)Rh(CO)_2$. The hydroformylation and reductive amination can be carried out in the presence of a phosphine compound that is of Formula (III)

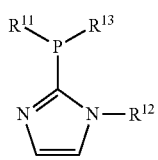
(III)

wherein
$R^{13}$ and $R^{11}$ are each independently an alkyl or aryl; and
$R^{12}$ is an aryl or an aryl optionally substituted with at least one alkyl or alkoxy group.

The $R^{13}$ and $R^{11}$ groups can each be independently alkyl or aryl, such as independently cycloalkyl. For example, the $R^{13}$ and $R^{11}$ groups can each be cyclohexyl, tert-butyl, iso-propyl, or phenyl. The $R^{12}$ group can be aryl optionally substituted with one, two or three alkyl groups. For example, the $R^{12}$ group can be phenyl, a mesityl group or a 2-methoxyphenyl group. An example of a suitable phosphine compound of the Formula (III) is the compound.

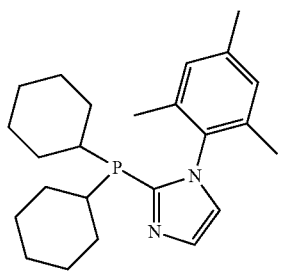 [SMILES: Cc1cc(C)c(-n2ccnc2P(C2CCCCC2)C2CCCCC2)c(C)c1]

The method for hydroformylating and reductively aminating the precursor polymer comprises forming a reaction mixture and exposing the reaction mixture to a gaseous mixture of carbon monoxide and hydrogen (e.g., a mixture having from about 2:1 $CO:H_2$ to about 1:5 $CO:H_2$, also called "syngas" or "synthesis gas"). The exposing step is carried out at a sufficiently elevated pressure (e.g., from about 300 psi to about 5000 psi) of a gaseous mixture of carbon monoxide and hydrogen and at a sufficiently elevated temperature (e.g., from about 60° C. to about 180° C.) and for a time (e.g., about 6 hours to about 100 hours) sufficient to hydroformylate and reductively aminate the precursor copolymer.

A first aminated copolymer is obtained from the tandem hydroformylation and reductive amination reaction. The first aminated copolymer has pendant groups of Formula (IA) and Formula (IB). The first aminated copolymer is, in turn, hydrogenated in the presence of a hydrogenation catalyst to provide a hydrogenated copolymer having pendant nitrogen-containing groups of Formula (IA) and (IB). The hydrogenating of the first aminated copolymer can comprise hydrogenating initially in the presence of at least one first transition metal catalyst used to complete the tandem hydroformylation and reductive amination reaction followed by hydrogenation in the presence of an added hydrogenation catalyst. But the hydrogenating can also be carried out entirely in the presence of a hydrogenation catalyst, without hydrogenating initially in the presence of at least one first transition metal catalyst used during the tandem hydroformylation and reductive amination reaction.

Hydrogenation decreases the number of carbon-carbon double bonds in the hydrocarbon backbone. After hydrogenating, wherein no more than 20 mole percent of the carbons in the hydrocarbon backbone are in double bonds. In some embodiments, no more than 15 mole percent, no more than 10 mole percent, no more than 5 mole percent, no more than 2 mole percent, or no more than 1 mole percent of the carbons in the hydrocarbon backbone are in double bonds. That is the amount of saturation in the hydrocarbon backbone is lowered during hydrogenation.

The method described herein can further comprise alkylating the hydrogenated nitrogen-containing copolymer with an alkylating agent to form a cationic copolymer. For example, the method can further comprise reacting the hydrogenated nitrogen-containing copolymer with an alkylating agent to form a cationic copolymer having pendant quaternary amino groups of Formula (IIA) and (IIB)

*—$CH_2CH_2CH_2$—$(NR^3R^4R^5)^+$ (IIA)

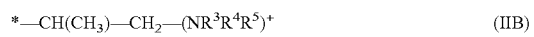
*—$CH(CH_3)$—$CH_2$—$(NR^3R^4R^5)^+$ (IIB)

wherein
$R^3$ and $R^4$ are each an alkyl or $R^3$ and $R^4$ together with the nitrogen to which they are both attached form a heterocyclic ring that is saturated, the heterocyclic ring optionally further comprising an oxygen heteroatom:
$R^5$ is an alkyl, a multi-cationic group of formula —$R^6$—$[(N(R^7)_2{}^+—R^6]_q—[N(R^8)_2R^9]^+$, or a multi-cationic group of formula —$R^6$—$[N(R^7)_2{}^+—R^6]_q—[X^1(R^{10})_2]^+$;
each $R^6$ is independently an alkylene;
each $R^7$ is independently an alkyl;
each $R^8$ is alkyl or both $R^8$ groups combine together with the nitrogen to which they are both attached to form a heterocyclic ring that is saturated, the heterocyclic ring optionally further comprising an oxygen heteroatom;
$R^9$ is an alkyl;
$X^1$ is CH or N;
both $R^{10}$ groups together with $X^1$ to which they are both attached form a heterocyclic ring that is saturated or unsaturated, wherein the heterocyclic ring further comprises a quaternary amino group;

q is an integer in a range of 0 to 3;

the molar ratio of pendant groups of Formula (IIA) to pendant groups of Formula (IIB) is at least 6; and each cationic group has an anionic counterion (e.g., chloride, bromide, iodide, bicarbonate, carbonate, hydroxide, alkoxide, acetate, sulfate, and the like).

The molar ratio of pendant quaternary amino groups of Formula (IIA) to (IIB) is at least about 6 (e.g., at least about 10, at least about 15, at least about 25, at least about 35, at least about 50, at least about 100 or at least about 500. For example, the molar ratio can be about 15 to about 50, about 30 to about 100, or about 80 to about 500).

Suitable alkylating agents include alkylating agents of Formula (IV)

$$\text{L-R}^5 \qquad (IV)$$

wherein L is a leaving group and $R^5$ is an alkyl. Examples of suitable leaving groups include halogen groups, such that the alkylating agent of the Formula (IV) is a halogenated compound, where L is chloro, iodo or bromo. Other suitable leaving groups include esters of sulfonic acids, including tosylate and mesylate.

In the pendant quaternary amino groups of Formula (IIA) and (IIB), $R^3$ and $R^4$ are each an alkyl or $R^3$ and $R^4$ together with the nitrogen to which they are both attached form a heterocyclic ring that is saturated, the heterocyclic ring optionally further comprising an oxygen heteroatom. For example, $R^3$ and $R^4$ together with the nitrogen to which they are attached form a 5 or 6 membered heterocyclic ring such as a pyrrolidinyl, piperidinyl, piperazinyl or a morpholinyl ring. In the pendant quaternary amino groups of Formula (IIA) and (IIB), the nitrogen atom(s) in the pyrrolidinyl, piperidinyl, piperazinyl or a morpholinyl ring is/are quaternized with the $R^5$ group.

In many embodiments, $R^5$ is an alkyl group. For example, in some cationic groups, $R^3$, $R^4$, and $R^5$ are each an alkyl group. In other cationic groups, $R^3$ and $R^4$ combine with the nitrogen to which they are both attached to form a 5 or 6 membered heterocyclic ring that is saturated. The heterocyclic ring members often contain only one nitrogen atom as a heteroatom but can contain an additional oxygen heteroatom.

In other embodiments, $R^5$ is a multi-cation group of formula $-R^6-[(N(R^7)_2{}^+-R^6]_q-[N(R^8)_2R^9]^+$ or $-R^6-[N(R^7)_2{}^+-R^6]_q-[X^1(R^{10})_2]^+$. When $R^5$ is a multi-cation group, $R^3$ and $R^4$ are usually alkyl groups.

When $R^5$ is of formula $-R^6-[(N(R^7)_2{}^+-R^6]_q-[N(R^8)_2R^9]^+$, the terminal group $-[N(R^8)_2R^9]^+$ forms a quaternary amino group with the adjacent $R^6$ group. The groups $R^8$ and $R^9$ can each be an alkyl group or both $R^8$ and $R^9$ combine with the nitrogen to which they are both attached to form a 5 or 6 membered heterocyclic ring that is saturated. The heterocyclic ring members often contain only one nitrogen atom as a heteroatom but can contain an additional oxygen heteroatom.

When $R^5$ is of formula $-R^6-[N(R^7)_2{}^+-R^6]_q-[X^1(R^{10})_2]^+$, the terminal group $-[X^1(R^{10})_2]^+$ has two $R^{10}$ groups that combine with the $X^1$ group (which is either N or CH) to form a heterocyclic ring that contains a quaternary amino group.

The instant disclosure also relates to a hydrogenated nitrogen-containing copolymer comprising:

1) a hydrocarbon backbone, wherein no more than 20 mole percent of the carbons in the hydrocarbon backbone are in double bonds (e.g., no more than 15 mole percent, no more than 10 mole percent, no more than 5 mole percent, no more than 2 mole percent, or no more than 1 mole percent of the carbons in the hydrocarbon backbone are in double bonds); and 2) pendant groups attached to the hydrocarbon backbone of Formula (IA) and Formula (IB)

$$*-CH_2CH_2CH_2-NR^1R^2 \qquad (IA)$$

$$*-CH(CH_3)-CH_2-NR^1R^2 \qquad (IB)$$

wherein a) $R^1$ is hydrogen or alkyl and $R^2$ is an alkyl; or b) $R^1$ and $R^2$ together with the nitrogen to which they are both attached form a heterocyclic ring having 0 to 2 additional heteroatoms selected from nitrogen or oxygen, wherein the molar ratio of pendant groups of Formula (IA) to pendant groups of Formula (IB) is at least 6.

The molar ratio of pendant groups of Formula (IA) and (IB) in the hydrogenated nitrogen-containing copolymer is at least about 6 (e.g., at least about 10, at least about 15, at least about 25, at least about 35, at least about 50, at least about 100, or at least about 500). The molar ratio is often in a range from about 15 to about 50, about 30 to about 100, or about 80 to about 500.

About 2 to about 20 mole percent of the carbon atoms in the hydrocarbon backbone have an attached pendant group of Formula (IA) or Formula (IB). The amount can be at least 4 mole percent, at least 6 mole percent, at least 8 mole percent, at least 10 mole percent, or at least 12 mole percent and can be up to 18 mole percent, up to 16 mole percent, up to 15 mole percent, or up to 10 mole percent. For example, the amount can be about 8 to about 15 or about 10 to about 20 mole percent.

The hydrogenated nitrogen-containing copolymer can also have pendant aryl groups (e.g., pendant groups derived from styrene-type repeat units, as the term "styrene-type repeat units" is defined herein). The amounts suitable are the same as in the precursor polymer.

The hydrogenated nitrogen-containing copolymer can be a random or block copolymer. The hydrogenated nitrogen-containing copolymer can comprise (a) a first block having pendant groups of Formula (IA) and (IB) and (b) a second polystyrene-type block.

The instant disclosure also relates to a cationic copolymer comprising:

1) a hydrocarbon backbone, wherein no more than 20 mole percent of the carbons in the hydrocarbon backbone are in double bonds (e.g., the amount can be no more than 15 mole percent, no more than 12 mole percent, no more than 10 mole percent, no more than 8 mole percent, no more than 5 mole percent, no more than 2 mole percent, or no more than 1 mole percent); and 2) pendant groups attached to the hydrocarbon backbone of Formula (IIA) and Formula (IIB)

$$*-CH_2CH_2CH_2-(NR^3R^4R^5)^+ \qquad (IIA)$$

$$*-CH(CH_3)-CH_2-(NR^3R^4R^5)^+ \qquad (IIB)$$

wherein $R^3$ and $R^4$ are each an alkyl or $R^3$ and $R^4$ together with the nitrogen to which they are both attached form a heterocyclic ring that is saturated, the heterocyclic ring optionally further comprising an oxygen heteroatom;

$R^5$ is an alkyl, a multi-cationic group of formula $-R^6-[(N(R^7)_2{}^+-R^6]_q-[N(R^8)_2R^9]^+$, or a multi-cationic group of formula $-R^6-[N(R^7)_2{}^+-R^6]_q-[X^1(R^{10})_2]^+$;

each $R^6$ is independently an alkylene;
each $R^7$ is independently an alkyl;
each $R^8$ is alkyl or both $R^8$ groups combine together with the nitrogen to which they are both attached to form a heterocyclic ring that is saturated, the heterocyclic ring optionally further comprising an oxygen heteroatom;
$R^9$ is an alkyl;
$X^1$ is CH or N;
both $R^{10}$ groups together with $X^1$ to which they are both attached form a heterocyclic ring that is saturated or unsaturated, wherein the heterocyclic ring further comprises a quaternary amino group;
q is an integer in a range of 0 to 3;
the molar ratio of pendant groups of Formula (IIA) to pendant groups of Formula (IIB) is at least 6; and
each cationic group has an anionic counterion (e.g., chloride, bromide, iodide, bicarbonate, carbonate, hydroxide, alkoxide, acetate, sulfate, and the like).

The molar ratio of pendant groups of Formula (IIA) and (IIB) in the cationic copolymer is at least about 6 (e.g., at least about 10, at least about 15, at least about 25, at least about 35, at least about 50, at least about 100 or at least about 500). The molar ratio can be, for example, in a range from about 15 to about 50, about 30 to about 100 or about 80 to about 500.

About 2 to about 20 mole percent of the carbon atoms in the hydrocarbon backbone have an attached pendant group of Formula (IIA) or Formula (IIB). The amount can be at least 4 mole percent, at least 6 mole percent, at least 8 mole percent, at least 10 mole percent, or at least 12 mole percent and can be up to 18 mole percent, up to 16 mole percent, up to 15 mole percent, or up to 10 mole percent. For example, the amount can be in a range from about 8 to about 15 mole percent or about 10 to about 20 mole percent.

The cationic copolymer can also have pendant aryl groups (e.g., pendant groups derived from styrene-type repeat units, as the term "styrene-type repeat units" is defined herein). The amounts suitable are the same as in the precursor polymer.

The cationic copolymer can be a random or block copolymer. The overall structure of the cationic copolymer is similar to that of the precursor copolymer with the pendant groups of Formula (IIA) and/or Formula (IIB) replacing the pendant vinyl groups of formula *—CH=CH₂ that were in the precursor copolymer. Further, many of the 1,4-butadiene repeat units in the precursor copolymer have undergone hydrogenation. These repeat units are typically replaced with

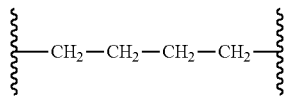

repeat units in the cationic copolymer. Hydrogenation can leave some residual carbon-carbon double bonds from the 1,4-butadiene repeat units. Typically, no more than 20 mole percent of the carbon atoms are in carbon-carbon double bonds.

As mentioned herein, the present disclosure relates to cationic polymers having a plurality of quaternary amino groups, that can be used to make membranes (e.g., solid, polymeric membranes), including membranes that can be used as polymeric anion exchange membranes.

Polymeric ion exchange membranes of the present disclosure are, in some examples, solid, meaning that it does not readily flow when poured. For example, they have a viscosity at ambient conditions of greater than $10^{10}$, $10^{11}$, $10^{12}$, or even $10^{13}$ Pascal seconds.

In one embodiment, the polymeric ion exchange membranes of the present disclosure are dense, meaning they form a continuous, nonporous film or layer.

In another embodiment, the polymeric ion exchange membranes of the present disclosure are porous, meaning the membranes contain open passages passing from one major surface of the membrane to the opposite major surface and these passages are at least large enough to allow some solvated ions to pass through. Examples include membranes classified as ultrafiltration membranes, nanofiltration membranes, microfiltration membranes, etc. These membranes typically have a nominal pore diameter of at least 0.02 micrometers.

As discussed herein, the cationic groups represented by the groups (IIA) and (IIB) can be present as pendant groups off the polymer backbone. The polymeric ion exchange membranes of the present disclosure comprise at least one cationic group, but, in some examples comprises an equivalent weight (grams of polymer per mole of ionic group) of 1000 or less, 500 or less, 350 or less, 250 or less or even 200 or less.

The polymeric ion exchange membranes of the present disclosure comprise at least one cationic group, but, in some examples comprises an equivalent weight of about 1 milliequivalents per gram of membrane (e.g., dry membrane), about 2 milliequivalents per gram of membrane, about 3 milliequivalents per gram of membrane, about 4 milliequivalents per gram of membrane or about 5 milliequivalents per gram of membrane.

The polymeric ion exchange membranes of the present disclosure may be made using techniques known in the art, for example, by casting a liquid composition comprising the cationic polymer, and drying and optionally annealing to form a membrane; or by extrusion of the molten cationic polymer. If desired, the cationic polymer can be crosslinked using any known crosslinking method.

In one embodiment, the polymeric ion exchange membranes of the present disclosure comprise a reinforcement material, such as a porous support (e.g., a woven or non-woven material made of a suitable material, such as a fluoropolymer, including expanded polytetrafluoroethylene, polyolefins such as porous polyethylene or polypropylene, electrospun nanofibers, fiberglass, polymer fibers, fiber mats, perforated films, and porous ceramics), which is imbibed (e.g., saturated or coated) with a liquid composition comprising a cationic polymer described herein either neat or containing solvent (e.g., dissolved in a suitable solvent), followed by removal of the solvent (if present) to embed the polymer into the pores of the reinforcement material. The porous support can be electrically non-conductive.

In one embodiment, the polymeric ion exchange membranes of the present disclosure have a thickness of less than 100 micrometers, less than 50 micrometers, or even less than 25 micrometers, and greater than 100 nanometers. In one embodiment, the distance between the anode and the cathode is less than 100 micrometers, less than 50 micrometers, or even less than 25 micrometers, and greater than 100 nanometers.

The polymeric ion exchange membranes of the present disclosure can have a swelling ratio. The swelling ratio can be characterized by the linear expansion ratio either in the chloride form or in the hydroxide form, which can be determined using the difference between wet and dry dimensions of a membrane sample (e.g., a sample measuring 3 cm in length and 1 cm in width) using equation (1):

$$SW(\%) = \frac{X_{wet} - X_{dry}}{X_{dry}} \times 100\% \qquad (1)$$

where $X_{wet}$ and $X_{dry}$ are the lengths of a wet and a dry membrane, respectively.

The swelling ratio in the chloride form can be less than about 60%, less than about 50%, less than about 40%, less than about 30%, less than about 20%, less than about 10% or less than about 5%. For example, the swelling ratio can be, on the upper end, about 60%, about 55%, about 50%, about 45%, about 40%, about 35% or about 30% and, on the lower end, about 25%, about 20%, about 15%, about 10%, about 5% or about 1%.

The swelling ratio in the hydroxide form can be less than about 90%, less than about 85%, less than about 80%, less than about 75%, less than about 70%, less than about 65%, less than about 60%, less than about 55%, less than about 50%, less than about 45%, less than about 40%, less than about 35% or less than about 30%. For example, the swelling ratio can be, on the upper end, about 90%, about 80%, about 70%, about 60% or about 50% and, on the lower end, about 45%, about 40%, about 35%, about 30%, about 25% or about 20%.

The polymeric ion exchange membranes of the present disclosure can be placed between two electrodes, the anode and cathode, of an electrochemical device. In some embodiments, the electrode is a gas diffusion electrode comprising a gas diffusion layer coated with a catalyst. Gas diffusion layers are known in the art and include for example carbon paper or cloth, or a metal mesh.

Examples of electrochemical devices include, but are not limited to, solid-state fuel cells, electrolyzers, chlor-alkali cells, solid polymer electrolyte batteries, redox flow batteries or electrochemical desalination devices.

Electrode materials can include, for example, graphitic carbon, glassy carbon, titanium, or any of the following "catalytically active elements": V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, Nd, and alloys or combinations thereof.

In one embodiment, the electrochemical device comprises catalytically active nanoparticles. The nanoparticles may be supported on carbon particles or nanostructured supports, such as carbon nanotubes or nanostructured thin films (NSTF) as disclosed, for example, in U.S. Pat. No. 8,748,330 (Debe, et al.).

In one embodiment, the electrochemical device comprises an extended surface area catalyst based electrode such as a nanostructured thin film electrode, nanotube electrode, porous sponge electrode, or two-dimensional polycrystalline film electrode.

In one embodiment, the cathode of the electrochemical device comprises a metal selected from silver, gold, copper, nickel, iron, or combinations thereof.

In one embodiment, the anode of the electrochemical device comprises a metal selected from ruthenium, iridium, platinum, titanium, or combinations thereof. In one embodiment, the electrochemical device is substantially free of platinum, meaning the electrode comprises less than 0.1%, less than 0.01% or even less than 0.001% by weight of platinum.

The cathode, the anode, and/or polymeric ion exchange membranes of the present disclosure can be assembled each as a separate component or can be fabricated wherein the polymeric ion exchange membrane (or a portion thereof) is fabricated with one or both electrodes or a portion thereof. For example, to maximize cost savings and in some instances performance, the individual components, or layers thereof, may be sufficiently thin, such that some of the components could act as a support during the fabrication of a thin layer. The various components or portions thereof can be laminated together, formed in situ on a surface of a component, and/or coated onto a component.

The membrane electrode assembly comprising the anode, cathode and polymeric ion exchange membranes of the present disclosure can be sandwiched between two flow field plates and then held together such that each layer is in contact, preferably intimate contact with the adjacent layers.

Embodiments of the present disclosure include a method for producing electricity with an electrochemical device comprising an anode, cathode and polymeric ion exchange membranes of the present disclosure, the method comprising: contacting a composition comprising hydrogen gas at the anode; contacting oxygen gas at the cathode; and producing electricity. The method can be accomplished with a system for producing electricity comprising an electrochemical device comprising an anode, cathode and polymeric ion exchange membranes of the present disclosure, a hydrogen gas input, wherein the hydrogen gas input is configured to provide a composition comprising hydrogen gas to an anode flow field for oxidation of the hydrogen gas at the anode electrode; and an oxygen gas input, wherein the oxygen gas input is configured to provide a composition comprising oxygen gas to a cathode flow field for reduction of the oxygen gas at the cathode electrode.

Embodiments of the present disclosure also include a method for electrochemically reducing carbon dioxide with an electrochemical device comprising an anode, cathode and polymeric ion exchange membranes of the present disclosure, the method comprising: introducing a composition comprising carbon dioxide to the cathode; and applying electrical energy to the electrochemical device to effect electrochemical reduction of the carbon dioxide. The method can be accomplished with a system for reducing carbon dioxide comprising: an electrochemical device comprising an anode, cathode and polymeric ion exchange membranes of the present disclosure; and a carbon dioxide input, wherein the carbon dioxide input is configured to provide a composition comprising carbon dioxide to a cathode flow field for reduction of the carbon dioxide at the cathode electrode.

As used herein the carbon dioxide input is a composition comprising, in one embodiment carbon dioxide in its pure form. In one embodiment, the composition comprising the carbon dioxide may be humidified, comprising at most 100% relative humidity and at least 1% relative humidity. Generally, the presence of water with the carbon dioxide input will generate hydrated forms of carbon dioxide including carbonate and bicarbonate. Alternatively, in one embodiment, the composition comprising the carbon dioxide may not be humidified.

A potential difference is applied across the electrochemical cell to electrochemically reduce the composition comprising the carbon dioxide. For the reduction of carbon dioxide, the cell is operated at a potential difference equal to or more positive than about 1.33V, with the highest potential difference being 4.0V. In some examples, the difference is within about 2.6 to about 3.4V.

The reaction products generated by the electrochemical reduction of the carbon dioxide, in addition to CO, hydrogen ($H_2$), and water, may include other reduced products, such as $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H$, $(COOH)_2$ or $(COO^-)_2$.

By varying the reactants and/or reaction parameters, such as the catalyst material, the anionic membrane material, solvent (if any), and reduction potential, the reaction products observed and their ratios can be adjusted. For example, in one embodiment, the rate of generating reaction products can be adjusted based on the availability of electrical energy from a carbon-neutral energy source. In one embodiment, syngas may be generated. Syngas is a mixture comprising carbon monoxide (CO) and hydrogen ($H_2$) and sometimes carbon dioxide, which can be used as a feedstock for synthesizing more complex carbon-based materials. Carbon monoxide selectivity of a reaction can be quantified by measuring the amount of carbon monoxide present in the reaction product versus the total amount of reaction products (e.g., hydrogen gas and carbon monoxide). In one embodiment, the electrochemical device of the present disclosure has a carbon monoxide selectivity of greater than 1, 2, 3, 4, 5, 10, 25, 30, 40 or even 50% and no more than 100%.

Embodiments of the present disclosure also include method for electrochemically reducing water with an electrochemical device comprising an anode, cathode and polymeric ion exchange membranes of the present disclosure, the method comprising: introducing a composition comprising water (e.g., liquid or gaseous water) to the cell; and applying electrical energy to the electrochemical device to effect electrochemical reduction of the water. The method can be accomplished with a system for reducing water comprising: an electrochemical device comprising an anode, cathode and polymeric ion exchange membranes of the present disclosure; and a water input, wherein the water input is configured to provide a composition comprising water to a cathode flow field for reduction of the water at the cathode electrode.

Illustrative embodiments of the present disclosure are as follows:

Embodiment 1 relates to a method of making a hydrogenated nitrogen-containing copolymer, the method comprising:

obtaining or providing a precursor copolymer that is a polymerized product of a monomer composition comprising butadiene, wherein the precursor copolymer is a random or block copolymer comprising:
1) a hydrocarbon backbone, wherein the hydrocarbon backbone has carbon-carbon double bonds;
2) unsaturated pendant groups *—CH=$CH_2$ attached to the hydrocarbon backbone, wherein the asterisk denotes the attachment site of the pendant group to the hydrocarbon backbone; and hydroformylating and reductively aminating the precursor copolymer in the presence of at least one transition metal catalyst to provide a first aminated copolymer, wherein the first aminated copolymer comprises:
1) a hydrocarbon backbone, wherein the hydrocarbon backbone has carbon-carbon double bonds;
2) nitrogen-containing pendant groups attached to the hydrocarbon backbone, the nitrogen-containing pendant groups being of Formula (IA) and Formula (IB)

  (IA)

  (IB)

wherein
a) $R^1$ is hydrogen or alkyl and $R^2$ is an alkyl; or
b) $R^1$ and $R^2$ together with the nitrogen to which they are both attached form a heterocyclic ring that is saturated, the heterocyclic ring optionally further comprising an oxygen heteroatom;
wherein the molar ratio of pendant groups of Formula (IA) to pendant groups of Formula (IB) is at least 6; and hydrogenating the first aminated copolymer in the presence of a hydrogenation catalyst to provide the hydrogenated nitrogen-containing copolymer having pendant nitrogen-containing groups of Formula (IA) and (IB).

Embodiment 2 relates to the method of Embodiment 1, wherein the precursor copolymer comprises repeat units having the unsaturated pendant groups in an amount of 5 to 40 mole percent based on total moles of repeat units in the precursor copolymer.

Embodiment 3 relates to the method of Embodiment 1 or 2, wherein the precursor copolymer is a random copolymer comprising repeat units of 1,4-butadiene and 1,2-butadiene and wherein the repeat units of 1,2-butadiene have the unsaturated pendant groups *—CH=$CH_2$.

Embodiment 4 relates to the method of any one of Embodiments 1 to 3, wherein the precursor copolymer is a block copolymer comprising:
at least one first polybutadiene block, wherein at least 80 mole percent of the repeat units are 1,4-butadiene based on total moles of repeat units in the first polybutadiene block; and
at least one second polybutadiene block, wherein at least 50 mole percent of the repeat units are 1,2-butadiene based on total moles of repeat units in the second polybutadiene block.

Embodiment 5 relates to the method of Embodiment 1 or 2, wherein the precursor copolymer further comprises styrene-type repeat units comprising styrene repeat units, alkyl substituted styrene repeat units, alpha-methyl styrene repeat units, or alkyl substituted alpha-methyl styrene repeat units.

Embodiment 6 relates to the method of Embodiment 5, wherein the precursor copolymer comprises 0 to 75 mole percent styrene-type repeat units based on total moles of repeat units in the precursor copolymer.

Embodiment 7 relates to the method of Embodiment 5, wherein the precursor copolymer is a block copolymer comprising a first polybutadiene block comprising repeat units of 1,4-butadiene and 1,2-butadiene and a second polystyrene-type block.

Embodiment 8 relates to the method of any one of Embodiments 1 to 7, wherein hydroformylating and reductively aminating the precursor copolymer comprises:
forming a reaction mixture comprising:
e) the precursor copolymer dissolved in an organic solvent;
f) an amine compound of formula $NHR^1R^2$;
g) at least one first transition metal catalyst;
h) an optional phosphine compound; and
exposing the reaction mixture to a gaseous mixture of carbon monoxide and hydrogen.

Embodiment 9 relates to the method of any one of Embodiments 1 to 8, wherein the at least one first transition metal catalyst is a ruthenium catalyst and/or a rhodium catalyst.

Embodiment 10 relates to the method of Embodiment 9, wherein the ruthenium catalyst is a ruthenium carbonyl catalyst.

Embodiment 11 relates to the method of Embodiment 10, wherein the ruthenium carbonyl catalyst is $Ru_3(CO)_{12}$.

Embodiment 12 relates to the method of Embodiment 9, wherein the rhodium catalyst is a rhodium carbonyl catalyst.

Embodiment 13 relates to the method of Embodiment 12, wherein the rhodium carbonyl catalyst is $(acac)Rh(CO)_2$.

Embodiment 14 relates to the method of Embodiment 8, wherein the phosphine compound is of the Formula (III)

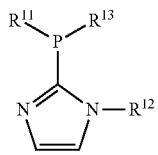

(III)

wherein $R^{13}$ and $R^{11}$ are each independently an alkyl or aryl; and $R^{12}$ is an aryl or an aryl optionally substituted with at least one alkyl or alkoxy group.

Embodiment 15 relates to the method of any one of Embodiments 1 to 14, wherein hydrogenating the first aminated copolymer comprises hydrogenating initially in the presence of the at least one first transition metal catalyst used during hydroformylating and reductively aminating followed by hydrogenating in the presence of the hydrogenation catalyst.

Embodiment 16 relates to the method of any one of Embodiments 1 to 15, wherein no more than 20 mole percent of the carbons in the hydrocarbon backbone are in double bonds.

Embodiment 17 relates to the method of Embodiment 15 or 16, wherein no more than 10 mole percent of the carbons in the hydrocarbon backbone are in double bonds.

Embodiment 18 relates to the method of any one of Embodiments 1 to 17, wherein $R^1$ and $R^2$ together with the nitrogen to which they are both attached form a heterocyclic ring that is saturated, the heterocyclic ring optionally further comprising an oxygen heteroatom;

Embodiment 19 relates to the method of any one of Embodiments 1 to 18, wherein the molar ratio of the pendant groups of Formula (IA) to pendant groups of Formula (IB) is at least 15.

Embodiment 20 relates to the method of any one of Embodiments 1 to 19, wherein the method further comprises reacting the first aminated copolymer with an alkylating agent to form a cationic copolymer having pendant quaternary amino groups of Formula (IIA) and (IIB)

$$*-CH_2CH_2CH_2-(NR^3R^4R^5)^+ \qquad (IIA)$$

$$*-CH(CH_3)-CH_2-(NR^3R^4R^5)^+ \qquad (IIB)$$

wherein $R^3$ and $R^4$ are each an alkyl or $R^3$ and $R^4$ together with the nitrogen to which they are both attached form a heterocyclic ring that is saturated, the heterocyclic ring optionally further comprising an oxygen heteroatom;

$R^5$ is an alkyl, a multi-cationic group of formula $-R^6-[(N(R^7)_2{}^+-R^6]_q-[N(R^8)_2R^9]^+$, or a multi-cationic group of formula $-R^6-[N(R^7)_2{}^+-R^6]_q-[X^1(R^{10})_2]^+$;

each $R^6$ is independently an alkylene;

each $R^7$ is independently an alkyl;

each $R^8$ is alkyl or both Ra groups combine together with the nitrogen to which they are both attached to form a heterocyclic ring that is saturated, the heterocyclic ring optionally further comprising an oxygen heteroatom;

$R^9$ is an alkyl;

$X^1$ is CH or N;

both $R^{10}$ groups together with $X^1$ to which they are both attached form a heterocyclic ring that is saturated or unsaturated, wherein the heterocyclic ring further comprises a quaternary amino group;

q is an integer in a range of 0 to 3;

the molar ratio of pendant groups of Formula (IIA) to pendant groups of Formula (IIB) is at least 6; and each cationic group has an anionic counterion.

Embodiment 21 relates to the method of Embodiment 20, wherein the alkylating agent is a halogenated compound of Formula (IV)

$$L-R^5 \qquad (IV)$$

wherein L is a halogen.

Embodiment 22 relates to the method of Embodiment 20 or 21, wherein the molar ratio of the pendant groups of Formula (IIA) to pendant groups of Formula (IIB) is at least 15.

Embodiment 23 relates to a hydrogenated nitrogen-containing copolymer prepared by the method of any one of Embodiments 1 to 19.

Embodiment 24 relates to a cationic copolymer prepared by the method of any one of Embodiments 20 to 22.

Embodiment 25 relates to a hydrogenated nitrogen-containing copolymer comprising:

1) a hydrocarbon backbone, wherein no more than 20 mole percent of the carbons in the hydrocarbon backbone are in double bonds; and 2) pendant groups attached to the hydrocarbon backbone of Formula (IA) and Formula (IB)

$$*-CH_2CH_2CH_2-NR^1R^2 \qquad (IA)$$

$$*-CH(CH_3)-CH_2-NR^1R^2 \qquad (IB)$$

wherein a) $R^1$ is hydrogen or alkyl and $R^2$ is an alkyl; or b) $R^1$ and $R^2$ together with the nitrogen to which they are both attached form a heterocyclic ring that is saturated, the heterocyclic ring optionally further comprising an oxygen heteroatom;

wherein the molar ratio of pendant groups of Formula (IA) to pendant groups of Formula (IB) is at least 6.

Embodiment 26 relates to a hydrogenated nitrogen-containing copolymer of Embodiment 25, wherein no more than 10 mole percent of the carbons in the hydrocarbon backbone are in double bonds.

Embodiment 27 relates to the hydrogenated nitrogen-containing copolymer of Embodiment 25 or 26, wherein the molar ratio of pendant groups of Formula (IA) to pendant groups of Formula (IB) is at least 15.

Embodiment 28 relates to the hydrogenated nitrogen-containing copolymer of any one of Embodiments 25 to 27, wherein 2 to 20 mole percent of the carbon atoms in the hydrocarbon backbone have an attached pendant group of Formula (IA) or Formula (IB).

Embodiment 29 relates to the hydrogenated nitrogen-containing copolymer of any one of Embodiments 25 to 28, wherein the hydrogenated nitrogen-containing copolymer further comprises pendant aryl groups.

Embodiment 30 relates to the hydrogenated nitrogen-containing copolymer of any one of Embodiments 25 to 29, wherein the hydrogenated nitrogen-containing copolymer is a random or block copolymer.

Embodiment 31 relates to the hydrogenated nitrogen-containing copolymer of any one of Embodiments 25 to 30, wherein the hydrogenated nitrogen-containing copolymer comprises (a) a first block having pendant groups of Formula (IA) and (IB) and (b) a second polystyrene-type block.

Embodiment 32 relates to a cationic copolymer comprising:

1) a hydrocarbon backbone, wherein no more than 20 mole percent of the carbons in the hydrocarbon backbone are in double bonds; and 2) pendant groups attached to the hydrocarbon backbone of Formula (IIA) and Formula (IIB)

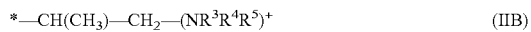

wherein $R^3$ and $R^4$ are each an alkyl or $R^3$ and $R^4$ together with the nitrogen to which they are both attached form a heterocyclic ring that is saturated, the heterocyclic ring optionally further comprising an oxygen heteroatom:

$R^5$ is an alkyl, a multi-cationic group of formula $—R^6—[(N(R^7)_2{}^+—R^6]_q—[N(R^8)_2R^9]^+$, or a multi-cationic group of formula $—R^6—[N(R^7)_2{}^+—R^6]_q—[X^1(R^{10})_2]^+$;

each $R^6$ is independently an alkylene;

each $R^7$ is independently an alkyl;

each $R^8$ is alkyl or both $R^8$ groups combine together with the nitrogen to which they are both attached to form a heterocyclic ring that is saturated, the heterocyclic ring optionally further comprising an oxygen heteroatom;

$R^9$ is an alkyl;

$X^1$ is CH or N;

both $R^{10}$ groups together with $X^1$ to which they are both attached form a heterocyclic ring that is saturated or unsaturated, wherein the heterocyclic ring further comprises a quaternary amino group;

q is an integer in a range of 0 to 3;

the molar ratio of pendant groups of Formula (IIA) to pendant groups of Formula (IIB) is at least 6; and each cationic group has an anionic counterion.

Embodiment 33 relates to the cationic copolymer of Embodiment 32, wherein no more than 10 mole percent of the carbons in the hydrocarbon backbone are in double bonds.

Embodiment 34 relates to the cationic copolymer of Embodiment 32 or 33, wherein the molar ratio of pendant groups of Formula (IIA) to pendant groups of Formula (IIB) is at least 15.

Embodiment 35 relates to the cationic copolymer of any one of Embodiments 32 to 34, wherein the cationic copolymer wherein 2 to 20 mole percent of the carbon atoms in the hydrocarbon backbone have an attached pendant group of Formula (IIA) or F(IIB).

Embodiment 36 relates to the cationic copolymer of any one of Embodiments 32 to 35, wherein the cationic copolymer further comprises pendant aryl groups.

Embodiment 37 relates to the cationic copolymer of any one of Embodiments 32 to 36, wherein the cationic copolymer is a random or block copolymer.

Embodiment 38 relates to the cationic copolymer of any one of Embodiments 32 to 37, wherein the hydrogenated nitrogen-containing copolymer comprises (a) a first block having pendant groups of Formula (IIA) and (IIB) and (b) a second polystyrene-type block.

Embodiment 39 relates to a membrane comprising the cationic polymer of any one of Embodiments 32 to 38.

Embodiment 40 relates to the membrane of Embodiment 39, wherein the membrane further comprises reinforcement material.

Embodiment 41 relates to the membrane of Embodiment 39 or 40, wherein the membrane is an anion exchange membrane.

Embodiment 42 relates to the membrane of any one of Embodiments 39 to 41, wherein the membrane has a positive charge density equal to at least 1 milliequivalent per gram of membrane.

Embodiment 43 relates to the membrane of any one of Embodiments 39 to 42, wherein the membrane has a charge density up to 5 milliequivalent per gram of membrane.

Embodiment 44 relates to an electrochemical device comprising:

an anode;

a cathode; and a membrane positioned between the anode and cathode, wherein the membrane is according to any one of Embodiments 39 to 43.

Embodiment 45 relates to the electrochemical device of Embodiment 44, wherein the electrochemical device is a solid-state fuel cell.

EXAMPLES

Advantages and embodiments of this disclosure are further illustrated by the following examples, but the materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or Alfa Aesar, Ward Hill, Mass. or known to those skilled in the art unless otherwise stated or apparent.

Foreseeable modifications and alterations of this invention will be apparent to those skilled in the art without departing from the scope of this invention. This invention should not be restricted to the embodiments that are set forth in this application for illustrative purposes.

TABLE 1

| List of materials used from example preparation | | |
|---|---|---|
| Abbreviation or Trade Name | Description | Source |
| Styrene | >99% | Available from Sigma-Aldrich Co., LLC, St. Louis, Missouri |
| 1,3-Butadiene | >99% | Available from Sigma-Aldrich Co., LLC, St. Louis, Missouri |
| Sec-butyllithium | 12 wt % sec-BuLi in cyclohexane | Available from FMC Lithium, Charlotte, North Carolina. |

TABLE 1-continued

List of materials used from example preparation

| Abbreviation or Trade Name | Description | Source |
|---|---|---|
| Di-n-butylmagnesium | 1.0 M in Heptane | Available from Sigma-Aldrich Co., LLC, St. Louis, Missouri |
| n-butyllithium | 24 wt % n-butyllithium in hexanes | Available from FMC Lithium, Charlotte, North Carolina. |
| Dibromoxylene | α,α'-Dibromo-p-xylene | Available from Sigma-Aldrich Co., LLC, St. Louis, Missouri |
| Toluene | Anhydrous, 99.8% | Available from Sigma-Aldrich Co., LLC, St. Louis, Missouri |
| Piperidine | 99% | Available from Alfa Aesar, Ward Hill, Massachusetts |
| Dimethylamine | Anhydrous, >99% | Available from Sigma-Aldrich Co., LLC, St. Louis, Missouri |
| Tert-butylamine | >99.5%, purified by redistillation | Available from Sigma-Aldrich Co., LLC, St. Louis, Missouri |
| THF | Tetrahydrofuran, anhydrous, 99.9%, inhibitor-free | Available from Sigma-Aldrich Co., LLC, St. Louis, Missouri |
| Cyclohexane | Anhydrous | Available from Sigma-Aldrich Co., LLC, St. Louis, Missouri |
| TCE | Tetrachloroethane, 98% | Available from Alfa Aesar, Ward Hill, Massachusetts |
| Ethanol | Denatured ethyl alcohol, pure, anhydrous, >99.5% | Available from Sigma-Aldrich Co., LLC, St. Louis, Missouri |
| DMF | N,N-Dimethylformamide | Available under the trade designation OMNISOLV from EMD Millipore, Burlington Massachusetts |
| DMSO | Methylsulfoxide | Available under the trade designation OMNISOLV from EMD Millipore, Burlington Massachusetts |
| Silica gel | 60 Angstrom, 200-425 mesh | Available from Sigma-Aldrich Co., LLC, St. Louis, Missouri |
| Basic alumina | Aluminum oxide, activated, basic | Available from Sigma-Aldrich Co., LLC, St. Louis, Missouri |
| CELITE | Diatomaceous earth | Available under the trade designation CELITE 545 from EMD Millipore, Burlington Massachusetts |
| Isopropanol | — | Available under the trade designation OMNISOLV from EMD Millipore, Burlington Massachusetts |
| Methanol | Anhydrous, 99.8 | Available from Sigma-Aldrich Co., LLC, St. Louis, Missouri |
| Methanol | — | Available under the trade designation OMNISOLV from EMD Millipore, Burlington Massachusetts |
| SBS | Styrene-butadiene-styrene block copolymer, approximately 26% mass 1,2-butadiene, approximately 32% mass poly(styrene) | D1192E, available from Kraton Corporation, Houston, Texas |
| SBR | Styrene-butadiene rubber, 14% vinyl content | Available under the trade designation RICON184 from Cray Valley, a division of Total Petrochemicals and Refining USA, Houston Texas |
| PBD | Random poly(butadiene), 28% mass 1,2-butadiene | Available under the trade designation RICON134 from Cray Valley, a division of Total Petrochemicals and Refining USA, Houston Texas |
| $PPh_3$ | Triphenylphosphine | Available from Alfa Aesar, Ward Hill, Massachusetts |
| $P(2\text{-OMePh})_3$ | Tris(orthomethoxyphenyl) Phosphine | Available from Alfa Aesar, Ward Hill, Massachusetts |
| $Pd/CaCO_3$ | Palladium hydrogenation catalyst, reduced, 5% Pd by mass | Available from Alfa Aesar, Ward Hill, Massachusetts |
| Pd/C | Palladium on carbon, 10 wt. % loading Pd, activated carbon support | Available from Sigma-Aldrich Co., LLC, St. Louis, Missouri |
| $Pd/BaSO_4$ | Palladium on barium sulfate, reduced, 5% wt. loading Pd | Available from Sigma-Aldrich Co., LLC, St. Louis, Missouri |
| $Pd(OAc)_2$ | Palladium acetate (99+%) | Available from Strem Chemicals Inc, Newburyport, Massachusetts |
| PICy | 1-(2,4,6-trimethylphenyl)-2(dicyclohexyl-phosphino)imidazole | Available from Strem Chemicals Inc, Newburyport, Massachusetts |
| $Ru_3(CO)_{12}$ | Ruthenium carbonyl | Available from Strem Chemicals Inc., Newburyport, Massachusetts |

TABLE 1-continued

List of materials used from example preparation

| Abbreviation or Trade Name | Description | Source |
|---|---|---|
| (PPh$_3$)$_3$Rh(CO)(H) | Hydridocarbonyltris-(tripheylphosphine)-rhodium(I) | Available from TCI America, Portland, Oregon |
| (acac)Rh(CO)2 | (Acetylacetonato)dicarbonyl rhodium(I) | Available from Sigma-Aldrich Co., LLC, St. Louis, Missouri |
| (PPh$_3$)$_3$RhCl | Chlorotris(triphenylphosphine) rhodium(I), 99%, Wilkinson's catalyst | Available from Strem Chemicals Inc., Newburyport, Massachusetts |
| methyl iodide | CH$_3$I, 99%, stabilized with copper | Available from Alfa Aesar, Ward Hill, Massachusetts |
| TFA | Trifluoroacetic acid, 99% | Available from Sigma-Aldrich Co., LLC, St. Louis, Missouri |
| AcOH | Acetic acid, CHROMANORM, for HPLC | Available from VWR International, Batavia, Illinois |
| CO$_2$ Cathode | Ag electrode | Dioxide Materials, Inc. (Boca Raton, FL) |
| CO$_2$ Anode | IrO$_2$ electrode | Dioxide Materials, Inc. (Boca Raton, FL) |
| KOH | 1N KOH volumetric solution J.T. Baker, Baker Analyzed Reagent, <1 ppm metals, | VWR Scientific (Radnor, PA) |
| KHCO$_3$ | KHCO$_3$ powder, 99.7%, ACS reagent | Available from Sigma-Aldrich Co., LLC, St. Louis, Missouri |
| CO$_2$ | Carbon dioxide gas, 99.999%, Research grade | Oxygen Service Co. (St. Paul, MN) |

General Considerations:

Polymer synthesis and reagent manipulations were conducted in a MBraun Labmaster SP glovebox (MBraun Inc., Stratham, N.H.) or in custom glassware designed to enable anionic polymerizations (for examples see Ndoni, S.; Papadakis, C. M.; Bates, F. S.; Almdal, K. Laboratory-scale Setup for Anionic Polymerization under Inert Atmosphere. *Review of Scientific Instruments* 1995, 66 (2), 1090-1095). Standard air-free techniques were used for reagent manipulations. Aminomethylations and hydrogenations were conducted in a Parr (Parr Instuent Company, Moline, Ill.) series 4530/40/50 (rated to 1900 psi (13 MPa)) 2-L stirred reactor with temperature control. Reagents and corresponding suppliers are listed above in Table 1.

Reagent Purification

Solvents, monomers, and reagents used for the anionic polymerization of block polymers were purified to be rigorously free of air, moisture, and protic impurities prior to use. Cyclohexane solvent was purified via solvent purification system (Pure Process Technology LLC, Nashua. N.H. 03064). THF used during anionic polymerizations was purified via solvent purification system (Pure Process Technology LLC, Nashua, N.H. 03064), collected in a flask containing n-butyllithium (3 mL, hexanes solvent removed in vacuo) and vacuum transferred to a receiving flask prior to use. Butadiene was condensed in a flask containing n-butyllithium (solvent removed in vacuo) cooled in liquid nitrogen, thawed in a nice water bath at 0° C. and stirred for 30 minutes, vacuum transferred to a second flask containing n-butyllithium (solvent removed in vacuo) and stirred for an additional 30 minutes at 0° C. before collecting the purified monomer in a flask by vacuum transfer. Styrene was degassed by repeated freeze-pump-thaw cycles, vacuum transferred to a flask containing di-n-butyl magnesium (heptane solvent removed in vacuo), stirred for at least 1 hour at 40° C., vacuum transferred to a second flask containing di-n-butyl magnesium (heptane solvent removed in vacuo), and stirred for at least 1 hour at 40° C. before being vacuum transferred to a receiving flask prior to use. All other materials were used as received.

Prior to reaction, KRATON styrene-butadiene-styrene (SBS) polymers were purified to remove talc and stabilizer package. This was accomplished by dissolving the polymer pellets in THF (approximately 15 wt %). The polymer solution as then filtered through basic alumina before the filtrate was reduced in volume to approximately 500 mL. Polymer was precipitated from methanol at room temperature with a final solvent composition of approximately 55/45 THF/methanol. Isolation was accomplished by filtration and the resulting white solid dried under high vacuum.

Palladium hydrogenation catalyst (5% on silica) was prepared by dissolving the appropriate amount of Pd(OAc)$_2$ in warm (40° C.) acetone (approximately 3 g in 130 mL). Silica gel was then added, and the suspension vigorously stirred for 20 minutes before solvent was removed under reduced pressure. The orange solid was dried under high vacuum before use.

All other chemicals were used as received.

Gel Permeation Chromatography (GPC)

The GPC equipment consisted of a 1260 Infinity LC (comprised of quaternary pump, autosampler, column compartment and diode array detector) from Agilent Technologies (Santa Clara, Calif., United States of America) operated at a flow rate of 1.0 mL/min. The GPC column set was comprised of a PLgel MIXED-A (300 mm length×7.5 mm internal diameter) plus a PLgel MIXED-B (300 mm length× 7.5 mm internal diameter), both from Agilent Technologies. The detection consisted of a DAWN HELEOS II 18 angle Light Scattering detector, a VISCOSTAR viscometer and an OPTILAB T-rEX differential refractive index detector, all 3 from Wyatt Technology Corporation (Santa Barbara, Calif., United States). Data were collected and analyzed using software ASTRA version 6 from Wyatt Technology Corporation. The column compartment, viscometer and differential refractive index detector were set to 40° C.

The solvent and eluent (or mobile phase) consisted of tetrahydrofuran (stabilized with 250 parts per million of butylated hydroxytoluene) OMNISOLV grade or tetrahydrofuran (stabilized with 250 parts per million of butylated hydroxytoluene) OMNISOLV grade modified with 5% v/v triethylamine (both from EMD Millipore Corporation, Burlington, Mass.). Triethylamine-containing solvent used for amine-containing samples.

Nuclear Magnetic Resonance (NMR)

A portion of the polymer sample was analyzed as a solution of unknown concentration (generally approximately 12 mg/mL) in dry deuterated benzene. NMR spectra were acquired on a Bruker AVANCE 600 MHz NMR spectrometer equipped with an inverse cryoprobe. 2D-NMR spectra (Heteronuclear Single Quantum Coherence-Total Correlation Spectroscopy, HSQC-TOCSY), $^{13}$C-NMR, and $^{1}$H-NMR were acquired for catalyst selectivity studies and 1,4- vs. iso-aminomethylated resonance assignments.

Membrane Swell Test—Chloride Form

Water mass uptake and planar swell of anion exchange membranes was measured in the chloride form (i.e., with chloride ions as the internal counterion) at room temperature. Dry polymer membranes were cut into strips about 1 cm wide by 10 cm long and an initial mass was measured. The films were then soaked in about 50 ml of 1 M NaCl for at least one hour with gentile agitation. This step was repeated two more times for a total of three soaks in the 1 M NaCl solution. The film was then rinsed three times in deionized water and the length change was measured using a ruler while the film was immersed in a tray of deionized water. The films were then padded dry to remove surface water and weighed immediately to obtain the water mass uptake. In the case where sample size was limited, square or rectangular films were used and the initial length, width, and mass measurements were recorded.

Membrane Swell Test—Hydroxide Form

Water mass uptake and planar swell of anion exchange membranes was measured in the hydroxide form at room temperature. Dry polymer membranes were cut into strips about 1 cm wide by 10 cm long and an initial mass was measured. The films were then soaked in about 50 ml of 1 M NaOH for at least one hour with gentile agitation. This step was repeated two more times for a total of three soaks in the 1 M NaOH solution. The film was then rinsed three times in deionized water and the length change was measured using a ruler while the film was immersed in a tray of deionized water. The films were then padded dry to remove surface water and weighed immediately to obtain the water mass uptake. In the case where sample size was limited, square or rectangular films were used and the initial length, width, and mass measurements were recorded.

Ion Exchange Capacity (IEC)

Ion exchange capacity was determined using an ion chromatography technique. A film of polymer in the iodide form with a mass of approximately 0.5 g was dried at 100° C. in an oven for 10 minutes then weighed for an accurate initial mass. The film was converted to the chloride form by soaking in 50 ml of 1 M NaCl while agitating with a model 150HT ultrasonic bath from VWR (Center Valley, Pa.) for 10 minutes. This step was repeated on the same film five more times for a total of six soaks in 1 M NaCl. The film was then removed and rinsed three times in 100 ml of deionized water each time. The film, now in the chloride form, was soaked in a polyethylene bottle containing 100 ml of 0.1 M NaOH while agitating with an ultrasonic bath for 10 minutes. The film was removed and the process was repeated with 100 ml 0.1 M NaOH and then with 50 ml of 0.1 M NaOH. All three NaOH solutions were combined to form one (250 ml) sample. An aliquot of this solution was then tested for chloride ion content by ion chromatography (IC) with a Thermo Scientific Dionex ICS-2000 (Thermo Fisher Scientific Inc.) using an IonPac AS18 column and an AG18 guard column (Thermo Fisher Scientific Inc.) The chromatograph was calibrated using certified standards obtained from Metrohm (Riverview, Fla.). These standards contain 0.1 ppm, 1.0 ppm, or 10 ppm of fluoride, chloride, bromide, sulfate, nitrate, and phosphate ions. Calibration standards were run prior to each campaign and two blanks of deionized water were run between samples. The concentration of chloride ions was used in combination with the initial mass to calculate the ion exchange capacity of each sample. In all cases the IEC was reported for the hydroxide form.

Ion Conductivity

Hydroxide conductivity was measured by an alternating current (AC) impedance method at room temperature. Membrane films were converted into the hydroxide form by soaking in about 50 ml of 1 M NaOH for at least one hour with gentile agitation. This step was repeated two more times for a total of three soaks in the 1 M NaOH solution. The film was then rinsed three times in deionized water. A 1 cm by 4 cm strip was cut and mounted into a 4-point probe conductivity cell with platinum wire electrodes. The sample cell was immersed in carbon-dioxide-free deionized water and the electrodes were connected to a Model 263A potentiostat from Princeton Applied Research (Trenton, N.J.) and an Impedance/Gain Phase Analyzer model SI 1260 from Ametek Scientific Instruments (Meerbusch, Germany). AC impedance measurements were performed using Zplot and Zview software from Scribner Associates (Southern Pines, N.C.).

$CO_2$ Electrolyzer Performance Measurement

A CO2 electrolyzer cell (fuel cell hardware from Fuel Cell Technologies Inc., Albuquerque, N. Mex., modified such that the graphite flow field on the anode side was removed and replaced with a titanium flow field) was assembled by placing the membrane of interest sandwiched between two spray-deposited electrodes: Ag cathode (Dioxide Materials, Inc.) on SGL 39BC carbon paper (5 cm2 geometric area), and IrO2 anode (Dioxide Materials, Inc.) on Toray 120-H, 5% PTFE carbon paper (7 cm2 geometric area). Glass filled PTFE gaskets were used to achieve 20% compression based on electrodes thickness. The assembly was tightened in a star pattern by applying 50 in-lbs torque. Humidified room temperature CO2 was fed into the cathode at 25 sccm, and 120 ml of 10 mM aqueous KHCO3 solution was recirculated on the anode side at 4.0 ml/min.

Before assembly, the Ag electrode and membrane were activated by soaking in an aqueous 1M KOH solution at room temperature for 24 hrs to exchange the anions in the as-synthesized polymer with OH— anions. Activated Ag electrode and membrane were removed from the solution and assembled while wet (without rinsing) in the cell for electrochemical testing.

The device as assembled was connected to a PAR 263a (or 273a) potentiostat (Ametek, Inc., Berwyn, Pa.). The cell potential was scanned to the desired voltage (3.0 V) at a 50 mV/s scan rate and the cell was switched to 3.0 V fixed cell voltage mode and run until the current value reached the desired current of 0.8 A. After that the cell was switched to constant current operation mode. The current was held constant at 160 mA/cm2 at RT until reaching 100 hrs test time with the experiment termination condition set at 3.5 V. The output gas stream from the cathode flow field was fed into an Agilent 7890B gas chromatograph (Agilent Technologies, Santa Clara, Calif.) for analysis of its chemical components.

Preparatory Example 1: Aminomethylation of SBS with Piperidine, $Ru_3(CO)_2$, and $(acac)Rh(CO)_2$ Polymer (45.0 g SBS, 567 mmol 1,4- and 1,2-butadiene C=C) was dissolved in toluene (450 mL) before being added to a 2 L Parr reaction that had been purged with Ar for greater than 10 minutes. Metal catalyst (45 mg (acac)Rh(CO)$_2$, 240 mg $Ru_3(CO)_{12}$) was then added to the reactor, followed by piperidine (90.0 mL). The reactor was then sealed and a syngas atmosphere was established by three cycles of pressurizing/venting the reactor with 200 psi (1.4 MPa) syngas (CO/H$_2$ 1:1) while stirring.

Once purged, the reactor was pressurized to 600 psi (4.1 MPa) before heating was initiated. The reactor was heated to 130° C. and heating was continued for 24 hours. During the reaction, a pressure of 800+/−50 psi (5.5+/−0.34 MPa) was maintained. The reactor was then cooled to room temperature, vented, and pressurized again with 600 psi (4.1 MPa) hydrogen. The reactor was then heated to 130° C. under stirring for an additional 12 hours before being cooled and vented prior to polymer isolation.

Polymer was isolated by first filtering the crude solution through silica gel. The filtrate was then evaporated to dryness before being dissolved in minimal THF (approximately 20% solids). Polymer was precipitated from acetone to afford a rubbery, light yellow solid. NMR analysis of the product aminomethylated polymer indicated the following conversion of butadiene C=C.

TABLE 2

NMR analysis of the conversion of SBS with Ru/Rh catalyst system. Mol % values for relative composition analysis based on residual unsaturation, amine, and styrene.

| Repeat Unit | Mol % |
| --- | --- |
| Styrene | 22 |
| 1,4-butadiene | 29 |
| 1,2-butadiene | 0 |
| 1,2-n-piperidine | 22 |
| 1,2-iso-piperidine | 3 |
| 1,4-piperidine | 6 |
| Isomerized butadiene | 18 |

Preparatory Example 2: Aminomethylation of SBS with Piperidine, $Ru_3(CO)_2$, and PICy As a representative example, SBS (40.0 g, approximately 195 mmol 1,2-butadiene C=C) was dissolved in toluene (450 mL). Piperidine was added to calcium hydride and stirred under Ar overnight. In the glovebox, $Ru_3(CO)_{12}$ (130 mg, 0.61 mmol Ru) and PICy ligand (260 mg, 0.67 mmol) were added to a 20 mL scintillation vial.

A clean, dry 2 L Parr reactor was purged with Ar for approximately 10 minutes prior to introduction of polymer solution (40.0 g SBS in 450 mL toluene, 195 mmol 1,2-butadiene C=C), $Ru_3(CO)_{12}$ metal complex (130 mg, 0.61 mmol Ru), and PICy (260 mg, 0.67 mmol). Piperidine (80.0 mL) was then added. The reactor was then sealed and assembled with appropriate gas inlets and vents. Syngas atmosphere was obtained with three cycles of pressurization to 200 psi (1.4 MPa) with syngas (H$_2$/CO 3:1) and venting with stirring. Once an inert, syngas atmosphere was established, the reactor was pressurized to 750 psi (5.2 MPa) with stirring. The reactor was heated to 130° C. and heating was continued for 48 hours. During the reaction, a pressure of 800+/−50 psi (5.5+/−0.34 MPa) was maintained. After cooling and venting, a light orange/yellow product solution was obtained.

Product polymer was obtained by filtering the crude polymer solution through a plug of silica gel. The filtrate was then evaporated to dryness using a rotary evaporator (rotovap) before being dissolved in minimal THF (20% solids). Polymer was precipitated from methanol to afford a rubbery, off-white solid. NMR analysis of the product aminomethylated polymer indicated the following conversion of butadiene C=C bonds.

TABLE 3

NMR analysis of the conversion of SBS with Ru/PICy catalyst system. Mol % values for relative composition analysis based on residual unsaturation, amine, and styrene.

| Repeat Unit | Mol % |
| --- | --- |
| Styrene | 22 |
| 1,4-butadiene | 42 |
| 1,2-butadiene | 0.7 |
| 1,2-n-piperidine | 27 |
| 1,2-iso-piperidine | 0.4 |
| 1,4-piperidine | 1.2 |
| Isomerized butadiene | 6.2 |

These results demonstrate that the reaction conditions can be adequately manipulated to improve 1,2-n selectivity and reduce double bond isomerization. For example, a comparison between Preparatory Example 1 and Preparatory Example 2 shows improvement in 1,2-n selectivity (5 fold increase) and a significant reduction in isomerization (approximately 3 fold less).

Preparatory Example 3: Aminomethylation of SBS with Tert-Butylamine, $Ru_3(CO)_{12}$, and PICy SBS (60.0 g, 300 mmol 1,2-PB) was dissolved in a mixture of toluene (450 mL) and methanol (70.0 mL). The polymer solution was introduced into a 2 L Parr reactor with $Ru_3(CO)_{12}$ (190 mg, 0.892 mmol Ru), PICy (350 mg, 0.915 mmol), and tert-butylamine (150 mL). The reactor was sealed and a syngas atmosphere was established with three cycles of pressurizing to 200 psi (1.4 MPa) and venting with syngas (H$_2$/CO 3:1). Once purged, the reactor was pressurized to 600 psi (4.1 MPa) with syngas and heated to 130° C. During the reaction, a pressure of 800+/−50 psi (5.5+/−0.34 MPa) was maintained. After 72 hours, the reaction was cooled to room temperature and vented. The reactor was purged once with 200 psi (1.4 MPa) hydrogen before being pressurized to 600 (4.1 MPa) psi with hydrogen. The reaction was then heated to 130° C. for 48 hours before being cooled and vented. Polymer was isolated by precipitation from methanol (~1 L) followed by filtration.

Preparatory Example 4: Aminomethylation of SBR with Piperidine, $Ru_3(CO)_{12}$, and PICy In a typical experiment, a Parr stainless autoclave (300 mL) was charged with $Ru_3(CO)_{12}$ (0.1 mol % relative to all C=C), ligand (PICy) (0.1 mol % relative to all C=C), polymer (SBR, 25.0 mmol C=C), piperidine (25 mmol), methanol (6 mL) and toluene (18 mL) under nitrogen atmosphere. The autoclave was pressurized initially with syngas (H$_2$/CO 2:1) (450 psi, (3.1 MPa)) and subsequently hydrogen (400-450 psi (2.8-3.1 MPa)) and the reaction was carried out at 130-133° C. for 50 hours. After the reactor was cooled to room temperature and depressurized, the reaction mixture was filtered through CELITE. The solvents were evaporated on a rotary evaporator and traces of volatiles were removed under vacuum at 60° C. and <1 torr vacuum for 10 hours. The resulting polymer was analyzed by $^1$H-NMR in order to establish the degree of hydroaminomethylation.

TABLE 4

Dependence of selectivity on reaction time and conversion with SBR. Conversion determined by integration of proton resonances for methylene groups adjacent to the piperidine nitrogen.
Starting SBR microstructure: 25% of 1,2-vinyl

| Reaction Time | 1,2-Conversion | 1,4-Conversion | 1,2 vs. 1,4 "CH$_2$N" |
|---|---|---|---|
| 20 h | 80% | <1% | 99-1 |
| 42 h | 96% | 5% | 83-17 |
| 50 h | >99% | 9% | 77-23 |

Preparatory Example 5: Aminomethylation of PBD with Piperidine, Ru$_3$(CO)$_{12}$, and PICy In a typical experiment, a Parr stainless autoclave (300 mL) was charged with Ru$_3$(CO) (0.1 mol % relative to all C=C), ligand (0.33 mol % relative to all C=C), PBD polymer 25.0 mmol), piperidine (12 mmol), methanol (6 mL) and toluene (18 mL) under nitrogen atmosphere. The autoclave was pressurized initially with syngas (H$_2$/CO 2:1) (450 psi, (3.1 MPa)) and subsequently hydrogen (400-450 psi (2.8-3.1 MPa)) and the reaction was carried out at 130-133° C. for 50 hours. After the reactor was cooled to room temperature and depressurized, the reaction mixture was filtered through basic (pH=8-9) CELITE. The solvents were evaporated on a rotary evaporator and traces of volatiles were removed under vacuum at 60° C. and <1 torr vacuum for 10 hours. The resulting polymer was analyzed by $^1$H-NMR in order to establish the degree of hydroaminomethylation.

TABLE 5

Dependence of selectivity on reaction time and conversion with PBD. Conversion determined by integration of proton resonances for methylene groups adjacent to the piperidine nitrogen.
Starting PBD microstructure: 25% of 1,2-vinyl

| Reaction Time | 1,2-Conversion | 1,4-Conversion | 1,2 vs. 1,4 "CH$_2$N" |
|---|---|---|---|
| 20 h | 80% | <1% | 99-1 |
| 42 h | 96% | <5% | 95-5 |
| 50 h | >98% | 5% | 96-4 |

Preparatory Example 6: Synthesis of (1,4-b-1,2-b-1,4)-Poly(butadiene)

A 2 L polymerization reactor apparatus was constructed and inert argon atmosphere established. 597 g of purified cyclohexane was added to the reactor and the reactor was heated to 40° C. via a water bath. Sec-butyllithium initiator (1.05 mL) was then added to the reactor and stirred for 30 minutes. Purified butadiene (46.6 g) was then added to the reactor. After reacting for approximately 16 hours, the reactor was cooled to approximately 15° C. via a water bath. Purified tetrahydrofuran (12.5 mLol) was added to the reactor via a gastight syringe. An aliquot of the first block was removed at this time for GPC and NMR analysis. Purified butadiene (15.3 g) was then added to the reactor and the reactor was then allowed to slowly warm to room temperature (temperature control was ceased). Approximately 5 hours after the addition of butadiene, the reaction was terminated with addition of the coupling agent dibromoxylene (0.180 g) dissolved in purified tetrahydrofuran to the reactor via a gastight syringe.

The polymer was isolated by precipitating the reaction mixture in a 2:1 by volume methanol isopropanol mixture, decanting off the solvent, and drying the polymer in a vacuum oven. Polymer composition was determined by $^1$H-NMR, polymer molecular weight and dispersity by GPC analysis.

These reaction conditions, more specifically, utilizing a hydrocarbon solvent for the polymerization of the first butadiene block and adding THF as a polar additive before adding the second charge of butadiene monomer to polymerize the second butadiene block, results in a first polybutadiene block with a high incorporation of 1,4-polybutadiene repeat units (93 mol % 1,4 repeat units, as measured by $^1$H-NMR) and a second polybutadiene block with high incorporation of 1,2-polybutadiene units (83 mol % 1,2 repeat units, as measured by $^1$H-NMR). Terminating with a difunctional coupling agent yields the (1,4-polybutadiene)-b-(1,2-polybutadiene)-b-(1,4-polybutadiene) triblock copolymer. Molecular characteristics of the synthesized polymer are summarized in the following table.

TABLE 6

Characterization data for (1,4-b-1,2-b-1,4)-Poly(butadiene)

| Sample Name | M$_w$ [a] (kg/mol) | PDI | 1,2-polybutadiene block (wt %) [b] |
|---|---|---|---|
| PE-6 | 67 | 1.05 | 24.7 |

[a] Absolute weight average molecular weight determined by GPC.
[b] Estimated from $^1$H -NMR.

Preparatory Example 7: Synthesis of Polystyrene-b-(1,2-Polybutadiene)-b-Polystyrene Triblock Copolymer Generally, polystyrene-b-(1,2-polybutadiene)-b-polystyrene triblock copolymer is prepared through sequential anionic polymerization of styrene, butadiene in the presence of a polar additive (THF), followed by a final addition of styrene. A representative experimental procedure for the synthesis of Preparatory Example 7A (PE-7A) follows.

A 2 L polymerization reactor apparatus was constructed and inert argon atmosphere established. 671 g of purified cyclohexane was added to the reactor and the reactor was heated to 40° C. via a water bath. Sec-butyllithium initiator (0.50 mL) was then added to the reactor and stirred for 30 minutes. Purified styrene (22.4 g) was then added to the reactor. After reacting for approximately 16 hr, the reactor was cooled to approximately ~20° C. via a water bath. Purified tetrahydrofuran (6 mL) was added to the reactor via a gastight syringe. Purified butadiene (15.7 g) was then added to the reactor and the reactor was then allowed to slowly warm to room temperature (temperature control was ceased). Approximately 6 hours after the addition of butadiene, the second charge of purified styrene (22.3 g) was added to the reactor. Approximately 16 hours after the second addition of styrene, the reaction was terminated with methanol (methanol was degassed by bubbling for at least 30 minutes with ultra high purity argon).

The polymer was isolated by precipitating the reaction mixture in a 2:1 by volume methanol:isopropanol mixture, decanting off the solvent, and drying the polymer in a vacuum oven. Polymer composition was determined by $^1$H-NMR, polymer molecular weight and dispersity by GPC analysis.

These reaction conditions, more specifically, utilizing a hydrocarbon solvent and the addition of THF as a polar additive before adding the charge of butadiene monomer to polymerize the butadiene block, results in a polybutadiene block with a high incorporation of 1,2-polybutadiene units (80 mol % 1,2 repeat units, as measured by $^1$H-NMR). Molecular characteristics of the synthesized polymer are summarized in the following table.

TABLE 7

Characterization data for polystyrene-b-(1,2-polybutadiene)-b-polystyrene

| Sample Name | $M_w$ [a] (kg/mol) | PDI | 1,2-polybutadiene block (wt %) [b] |
|---|---|---|---|
| PE-7A | 102 | 1.2 | 24.8 |
| PE-7B | 131 | 1.01 | 29.6 |

[a] Absolute weight average molecular weight determined by GPC.
[b] Estimated from $^1$H-NMR.

Preparatory Example 8: Synthesis of polystyrene-b-(1,4-polybutadiene)-b-(1,2-polybutadiene)-b-(1,4-polybutadiene)-b-polystyrene Pentablock Polymer Generally, polystyrene-b-(1,4-polybutadiene)-b-(1,2-polybutadiene)-b-(1,4-polybutadiene)-b-polystyrene pentablock polymer is prepared through sequential anionic polymerization of styrene followed by butadiene in a nonpolar solvent, then butadiene in the presence of a polar additive (THF), before being terminated by the addition of a coupling agent (dibromoxylene). A representative experimental procedure for the synthesis of Preparatory Example 8A (PE-8A) follows. Additional examples (PE-8B, PE-8C) were prepared by appropriately modifying the amounts of Sec-butyllithium, styrene, butadiene, THF, and dibromoxylene.

A 2 L polymerization reactor apparatus was constructed and inert argon atmosphere established. 697 g of purified cyclohexane was added to the reactor and the reactor was heated to 40° C. via a water bath. Sec-butyllithium initiator (0.92 mL) was then added to the reactor and stirred for 30 minutes. Purified styrene (29.9 g) was then added to the reactor. Approximately 24 hours after the addition of styrene, purified butadiene (16.8 g) was then added to the reactor. Approximately 16 hours after the addition of butadiene, the reactor was cooled to approximately 20° C. via a water bath. Purified tetrahydrofuran (11 mL) was added to the reactor via a gastight syringe. An aliquot of the polymer was removed at this time for GPC and NMR analysis. A second charge of purified butadiene (15.3 g) was then added to the reactor and the reactor was then allowed to slowly warm to room temperature (temperature control was ceased). Approximately 4 hours after the second addition of butadiene, the reaction was terminated with addition of the coupling agent dibromoxylene (0.158 g) dissolved in purified tetrahydrofuran to the reactor via a gastight syringe.

The polymer was isolated by precipitating the reaction mixture in a 2:1 by volume methanol:isopropanol mixture, decanting off the solvent, and drying the polymer in a vacuum oven. Polymer composition was determined by $^1$H-NMR, polymer molecular weight and dispersity by GPC analysis.

These reaction conditions, more specifically, utilizing a hydrocarbon solvent for the polymerization of styrene and first butadiene blocks and the addition of THF as a polar additive before the second charge of butadiene monomer is added to the reactor to polymerize the second butadiene block, results in a first polybutadiene block with a high incorporation of 1,4-polybutadiene repeat units (93 mol % 1,4 repeat units, as measured by $^1$H-NMR) and a second polybutadiene block with high incorporation of 1,2-polybutadiene units (85 mol % 1,2 repeat units, as measured by $^1$H-NMR). Terminating with a difunctional coupling agent such as dibromoxylene predominantly yields the polystyrene-b-(1,4-polybutadiene)-b-(1,2-polybutadiene)-b-(1,4-polybutadiene)-b-polystyrene pentablock polymer. Molecular characteristics of the synthesized polymer are summarized in the following table.

TABLE 8

Characterization data for polystyrene-b-(1,4-polybutadiene)-b-(1,2-polybutadiene)-b-(1,4-polybutadiene)-b-polystyrene

| Sample Name | $M_n$ [a] (kg/mol) | PDI | 1,2-polybutadiene block (wt %) [b] | polystyrene blocks (wt %) [b] |
|---|---|---|---|---|
| PE-8A | 85 | 1.07 | 24.0 | 49.5 |
| PE-8B | 74 | 1.66 | 28.7 | 50.2 |
| PE-8C | 74 | 1.09 | 33.8 | 52.5 |

[a] Number average molecular weight determined by GPC.
[b] Estimated from $^1$H-NMR.

Preparatory Example 9: Synthesis of polystyrene-b-(1,4-polybutadiene)-b-(1,2-polybutadiene)-b-polystyrene Tetrablock Polymer A 2 L polymerization reactor apparatus was constructed and inert argon atmosphere established. 695 g of purified cyclohexane was added to the reactor and the reactor was heated to 40° C. via a water bath. Sec-butyllithium initiator (0.48 mL) was then added to the reactor and stirred for 30 minutes. Purified styrene (16.8 g) was then added to the reactor. Approximately 5 hours after the addition of styrene, purified butadiene (17.7 g) was then added to the reactor. Approximately 16 hours after the addition of butadiene, the reactor was cooled to approximately 20° C. via a water bath. Purified tetrahydrofuran (15 mL) was added to the reactor via a gastight syringe. A second charge of purified butadiene (16.8 g) was then added to the reactor and the reactor was allowed to slowly warm to room temperature (temperature control was ceased). Approximately 6 hours after the second addition of butadiene, a second charge of purified styrene (16.8 g) was added to the reactor. Approximately 16 hours after the second addition of styrene, the reaction was terminated with methanol (methanol was degassed by bubbling for at least 30 minutes with ultra high purity argon).

The polymer was isolated by precipitating the reaction mixture in a 2:1 by volume methanol:isopropanol mixture, decanting off the solvent, and drying the polymer in a vacuum oven. Polymer composition was determined by $^1$H-NMR, polymer molecular weight and dispersity by GPC analysis.

These reaction conditions, more specifically, utilizing a hydrocarbon solvent for the polymerization of styrene and first butadiene blocks and the addition of THF as a polar additive before the second charge of butadiene monomer is added to the reactor to polymerize the second butadiene block, results in a first polybutadiene block with a high incorporation of 1,4-polybutadiene repeat units (93 mol % 1,4 repeat units, as measured by $^1$H-NMR) and a second polybutadiene block with high incorporation of 1,2-polybutadiene units (83 mol % 1,2 repeat units, as measured by $^1$H-NMR). Adding a second styrene end block yields the polystyrene-b-(1,4-polybutadiene)-b-(1,2-polybutadiene)-b-polystyrene tetrablock polymer. Molecular characteristics of the synthesized polymer are summarized in the following table.

TABLE 9

Characterization data for polystyrene-b-(1,4-polybutadiene)-b-(1,2-polybutadiene)-b-polystyrene

| Sample Name | $M_n$ [a] (kg/mol) | PDI | 1,2-polybutadiene block (wt %) [b] | polystyrene blocks (wt %) [b] |
|---|---|---|---|---|
| PE-9 | 93 | 1.02 | 24 | 51 |

[a] Number average molecular weight determined by GPC.
[b] Estimated from $^1$H -NMR.

Preparatory Example 10: Aminomethylation of (1,4-b-1,2-b-1,4)-Poly(butadiene) with Dimethylamine, $Ru_3(CO)_{12}$, and PICy (1,4-b-1,2-b-1,4)-polybutadiene (59.0 g, 218 mmol 1,2-butadiene C=C) was dissolved in toluene (450 mL) and methanol (60 mL). Once dissolved, the polymer solution was added to a 2 L Parr reactor. $Ru_3(CO)_{12}$ (140 mg, 0.66 mmol Ru) and PICy (280 mg, 0.73 mmol) were then added. The reactor was then sealed and placed under syngas atmosphere with three cycles of pressurization and venting at 200 psi (1.4 MPa) (syngas, $H_2$/CO 3:1). Once purged, the reactor was cooled with an ice bath before being attached to a dimethylamine tank and Schlenk line. An inert atmosphere was established in the transfer line. Dimethylamine (22.2 g) was then added.

The reactor was then attached to the syngas tank ($H_2$/CO 3:1) and heating mantle before being heated to 25° C. Once warmed to 25° C., the reactor was pressurized to 600 psi (4.1 MPa). The reactor was heated to 130° C. and heating was continued for 48 hours. During the reaction, a pressure of 800+/−50 psi (5.5+/−0.34 MPa) was maintained. After cooling and venting, a light orange/yellow product solution was obtained.

After 48 hours, the reactor was then cooled, vented, and purged twice at 200 psi (1.4 MPa) with hydrogen. The reactor was then pressurized to 700 psi (4.8 MPa) and heated to 130° C. (same manner as described above) for 16 hours. Once cooled and vented, polymer was isolated by precipitation from ethanol (1 L) to provide a waxy solid.

Preparatory Example 11: Aminomethylation of polystyrene-b-(1,2-polybutadiene)-b-polystyrene with Amine, $Ru_3(CO)_{12}$, and PICy The aminomethylation of Preparatory Example 11 (PE-11A and PE-11B) was completed in a manner similarly described above in PE-2. A representative example for the synthesis of PE-11A follows. PE-11B was prepared in an analogous manner with piperidine (45 mL) substituted for dimethylamine and PE-7B (56 g) used as a precursor polymer.

PE-7A (50.0 g, 177 mmol, 1,2-C=C) was dissolved in toluene (450 mL) and methanol (50 mL). A 2 L Parr reactor was purged with Ar for 15 minutes prior to introduction of reagents. The polymer solution, $Ru_3(CO)_{12}$ (120 mg, 0.563 mmol), and PICy (220 mg, 0.575 mmol) were added to the reactor. The reactor was then sealed and placed under syngas atmosphere with three cycles of pressurization and venting at 200 psi (1.4 MPa) (syngas, $H_2$/CO 3:1). Once purged, the reactor was cooled with an ice bath before being attached to a dimethylamine tank and Schlenk line. An inert atmosphere was established in the transfer line. Dimethylamine (38.0 g, 843 mmol) was then condensed into the reactor.

The reactor was then attached to a syngas tank (H/CO 3:1) and heating mantle before being heated to 25° C. Once warmed to 25° C., the reactor was pressurized to 600 psi (4.1 MPa). The reactor was heated to 130° C. and heating was continued for 48 hours. During the reaction, a pressure of 800+/−50 psi (5.5+/−0.34 MPa) was maintained.

After 48 hours, the reactor was then cooled, vented, and purged twice at 200 psi (1.4 MPa) with hydrogen. The reactor was then pressurized to 700 psi (4.8 MPa) and heated to 130° C. (same manner as described above) for 16 hours. Once cooled and vented, an orange homogeneous solution was collected. Polymer was isolated by precipitation from methanol (1.5 L) followed by drying in a vacuum oven.

Polymers were characterized by $^1$H-NMR. Approximately 63% of the 1,2-butadiene repeat units in PE-7A had been converted to pendant amines. For PE-11B, approximately 86% of the 1,2-butadiene repeat units in PE-7B had been converted to pendant amines.

Preparatory Example 12: Aminomethylation of polystyrene-b-(1,4-polybutadiene)-b-(1,2-polybutadiene)-b-(1,4-polybutadiene)-b-polystyrene Pentablock Polymer with Piperidine, $Ru_3(CO)_{12}$, and PICy The aminomethylation of Preparatory Example 12 (PE-12A, PE-12B, and PE-12C from PE-8A, PE-8B, PE-8C, respectively) was completed in a manner similarly described above in PE-2. A representative example for the synthesis of PE-12A follows. PE-12B and PE-12C were prepared in an analogous manner with proportional amounts of catalyst, amine, and PE-8B or PE-8C used as a precursor polymer.

PE-8A (60.0 g, 266 mmol, 1,2-C=C) was dissolved in toluene (500 mL) and methanol (100 mL). A 2 L Parr reactor was purged with Ar for 15 minutes prior to introduction of reagents. The polymer solution, $Ru_3(CO)_{12}$ (170 mg, 0.798 mmol), PICy (307 mg, 0.803 mmol), and piperidine (40.0 mL, 405 mmol) were added to the reactor. The reactor was then sealed and placed under syngas atmosphere with three cycles of pressurization and venting at 200 psi (1.4 MPa) (syngas, $H_2$/CO 3:1). The reactor was pressurized to 600 psi (4.1 MPa). The reactor was heated to 130° C. and heating was continued for 48 hours. During the reaction, a pressure of 800+/−50 psi (5.5+/−0.34 MPa) was maintained.

After 48 hours, the reactor was then cooled, vented, and purged twice at 200 psi (1.4 MPa) with hydrogen. The reactor was then pressurized to 700 psi (4.8 MPa) and heated to 130° C. (same manner as described above) for 16 hours. Once cooled and vented, an aliquot of the reaction solution was collected for characterization. Sequential hydrogenation of the reaction products is described in Example 5. Product was isolated from the aliquot by precipitation from methanol (~5× the volume of the aliquot) followed by drying under high vacuum.

Polymers were characterized by $^1$H-NMR. Approximately 70% of the 1,2-butadiene repeat units in PE-8A had been converted to pendant amines. For PE-12B, approximately 90% of the 1,2-butadiene repeat units in PE-8B had been converted to pendant amines. For PE-12C, approximately 75% of the 1,2-butadiene repeat units in PE-8C had been converted to pendant amines.

Preparatory Example 13: Aminomethylation of polystyrene-b-(1,4-polybutadiene)-b-(1,2-polybutadiene)-b-polystyrene Tetrablock Polymer with Dimethylamine, Ru$_3$(CO)$_{12}$, and PICy PE-9 (64.0 g, 272 mmol, 1,2-C=C) was dissolved in toluene (400 mL) and methanol (100 mL). A 2 L Parr reactor was purged with Ar for 15 minutes prior to introduction of reagents. The polymer solution, Ru$_3$(CO)$_{12}$ (174 mg, 0.816 mmol), and PICy (315 mg, 0.817 mmol) were added to the reactor. The reactor was then sealed and placed under syngas atmosphere with three cycles of pressurization and venting at 200 psi (1.4 MPa) (syngas, H$_2$/CO 3:1). Once purged, the reactor was cooled with an ice bath before being attached to a dimethylamine tank and Schlenk line. An inert atmosphere was established in the transfer line. Dimethylamine (38.0 g, 843 mmol) was then condensed into the reactor. The contents of the reactor were allowed to warm to room temperature and stirred for 12 hours.

The reactor was then pressurized to 600 psi (4.1 MPa). The reactor was heated to 130° C. and heating was continued for 48 hours. During the reaction, a pressure of 800+/−50 psi (5.5+/−0.34 MPa) was maintained.

After 48 hours, the reactor was then cooled, vented, and purged twice at 200 psi (1.4 MPa) with hydrogen. The reactor was then pressurized to 700 psi (4.8 MPa) and heated to 130° C. (same manner as described above) for 16 hours. Once cooled and vented, an orange homogeneous solution was collected. Polymer was isolated by precipitation from methanol (1.5 L) followed by drying in a vacuum oven.

Polymer was characterized by $^1$H-NMR. Approximately 82% of the 1,2-butadiene repeat units in PE-9 had been converted to pendant amines.

Comparative Example 1: Aminomethylation of SBS with Piperidine, Ru$_3$(CO)$_{12}$, (acac)Rh(CO)$_2$, and Triaryl Phosphine The above procedure for Preparatory Example 1 was followed except the following amounts were as shown in Table 10.

TABLE 10

Reagent amounts for aminomethylation of SBS with Ru/Rh catalyst system in the presence of added triaryl-phosphine ligand.

| Run | SBS (g) | Phosphine | Phosphine (mg) | (acac) RhCO$_2$ (mg) | Ru$_3$(CO)$_{12}$ (mg) | Piperidine (mL) | Toluene (mL) |
|---|---|---|---|---|---|---|---|
| CE-1A | 30 | PPh$_3$ | 455 | 30 | 160 | 60 | 400 |
| CE-1B | 40 | P(2-OMePh)$_3$ | 1007 | 30 | 160 | 60 | 400 |

Within an hour of reaching 130° C., the polymer solution had extensively crosslinked. Upon cooling and venting, a sticky, rubbery solid was obtained. It could not be dissolved in THF, dichloromethane, acetone, ethanol, dimethylformamide, or dimethylsulfoxide. Instead, the polymer swelled. Analysis of the product could not be conducted as it did not dissolve in any common NMR solvents. However, gas consumption during the reaction corresponded to approximately 50% of that observed in the absence of phosphine, e.g., in Preparatory Example 1 (PE1).

Comparative Example 2: Aminomethylation of SBS with Piperidine and (PPh$_3$)$_3$RhH(CO)

The above Preparative Example 1 procedure was followed except (PPh$_3$)$_3$RhH(CO) (138 mg) was used as the transition metal catalyst with SBS (38.2 g), toluene (400 mL), and piperidine (78.0 mL).

At the end of the reaction, a thick, yellow-amber high molecular weight product was obtained. The product still flowed, but the increase in solution viscosity was severe compared to the starting solution.

Comparative Example 3: Attempted Hydroxymethylation with SBS, Ru$_3$(CO)$_{12}$, and PICy A 2.0 L Parr stainless autoclave was charged with SBS (30.0 g, 146 mmol 1,2-butadiene), Ru$_3$(CO)$_{12}$ (186 mg, 0.876 mmol Ru, 0.6 mol % relative to 1,2-butadiene), PICy (370 mg, 0.963 mmol, 1.10 mol % relative to Ru), toluene (300 mL) and ethanol (100 mL) under argon atmosphere. The autoclave was purged and pressurized at room temperature with syngas (H$_2$/CO 3:1, 600 psi (4.1 MPa)) and the reaction was carried out at 130-133° C. for 48 hours. Syngas was periodically added to keep the pressure of the reaction within 50 psi (0.34 MPa) of 800 psi (5.5 MPa).

After 48 hours, the reactor was then cooled and vented to less than 20 psi (0.14 MPa). The reactor was then pressurized to 650 psi (4.5 MPa) with hydrogen and heated to 130° C. for 16 hours. At the end of the hydrogen step, no significant drop in pressure was observed (no detectable change).

The reactor was cooled to room temperature and vented. Upon opening the reactor, a highly cross-linked solid was discovered. The material was very brittle despite being saturated with toluene and ethanol. The material could not be dissolved in any of the following solvents: THF, dichloromethane, N,N-dimethylformamide, water, isopropanol, acetone. This demonstrates that in some instances, polymers can crosslink, which retards reaction kinetics and results in unprocessable materials.

Comparative Example 4: Aminomethylation Reaction of SBS, Piperidine, Ru$_3$(CO)$_2$, and PPh$_3$ A 2.0 L Parr stainless autoclave was charged with SBS (31.5 g, 153 mmol 1,2-butadiene), Ru$_3$(CO)$_1$ (250 mg, 1.17 mmol Ru, 0.76 mol % relative to 1,2-butadiene), PPh$_3$ (350 mg, 1.33 mmol, 1.14 mol % relative to Ru), piperidine (55 mL), and toluene (400 mL) under argon atmosphere. The autoclave was purged and pressurized at room temperature with syngas (H$_2$/CO; 3-1, 600 psi (4.1 MPa)) before the reaction was carried out at 130-133° C. for 40 hours. After 40 hours, <20 psi (0.14 MPa) of gas had been consumed, indicating limited reaction. As no significant conversion was observed, a second treatment with hydrogen was omitted, in contrast to Comparative Example 3 (CE3). See Table 11 below.

The reactor was cooled to room temperature and vented. A polymer sample was prepared by precipitation from methanol. $^1$H-NMR indicated poor conversion (approximately 10%) of C═C bonds.

TABLE 11

Comparison of catalytic efficiency of $Ru_3(CO)_{12}$ with PICy and $PPh_3$. Reactions conducted in approximately 10% (m/v) toluene at 130° C. for 40 hours.

| Example | Metal | Amine | mol % Ru: 1,2-C═C | Ligand | Ligand:Ru (mol %) | Total C═C Conversion (%) |
|---|---|---|---|---|---|---|
| PE2 | $Ru_3(CO)_{12}$ | Piperidine | 0.31 | PICy | 1.10 | 49.8 |
| CE4 | $Ru_3(CO)_{12}$ | Piperidine | 0.76 | $PPh_3$ | 1.14 | 10.2 |

These results demonstrate that it can be advantageous to use the PICy ligand is unobvious in polymeric P studies such as the ones described herein. The report by Beller (J. Am. Chem. Soc., 2013, 3989) notes that conversion efficiency of $PPh_3$ should reasonably be within 20% of PICy. In this example, however, $PPh_3$ does not display efficient reaction kinetics with a poly(butadiene) copolymer even at elevated catalyst loadings.

Example 1: Hydrogenation of Piperidine-Substituted Poly(Butadiene)

As a general procedure, aminated polybutadiene (prepared as described in Preparatory Example 5 (PE-5)) was dissolved in the appropriate solvent (6% solids). Heterogeneous Pd catalyst was added to a 300 mL Parr reactor and the reactor was purged with Ar for 30 minutes. Polymer solution was then introduced through an injection port. While stirring, a hydrogen atmosphere was then established with three cycles of pressurizing/venting with 200 psi (1.4 MPa) hydrogen. The reactor was then pressurized to 600 psi (4.1 MPa) before heating to 90° C. was initiated. The hydrogenation was allowed to stir for the prescribed amount of time before the reaction was cooled and vented.

The crude polymer solution was then filtered through silica gel and precipitated from methanol. Drying under high vacuum afforded the product polymer. Conversion rate was determined by NMR analysis of residual unsaturation.

TABLE 12

Conditions for the hydrogenation of amine-substituted poly(butadiene)

| Example | Catalyst | Catalyst Load (% per C═C) | Solvent | Temp: 90° C. Time (h) | Conversions |
|---|---|---|---|---|---|
| CE5 | Pd/C | 2% | Cyclohexane-THF (1:1) | 50 | <5% |
| CE6 | Pd/C | 2% | THF-AcOH ([AcOH] = 2 eq per N) | 50 | <5% |
| EX-1A | Pd/CaCO$_3$ | 1% | Cyclohexane-THF-MeOH (1:1:1) | 50 | 95% |
| EX-1B | Pd/CaCO$_3$ | 3% | Cyclohexane-EtOH (3:1) | 60 | >99% |
| EX-1C | Pd/BaSO$_4$/TFA (2 equivalents per nitrogen) | 2% | Cyclohexane-THF-MeOH (1:1:1) | 48 | >97% |
| EX-1D | Pd/SiO$_2$ | 1.5% | Cyclohexane-EtOH (3:1) | 60 | 99% |
| EX-1E | Pd/SiO$_2$ | 2.5% | Cyclohexane-EtOH (3:1) | 55 | >99.5% |

Example 2: Hydrogenation of Piperidine-Substituted SBS Block Copolymer

The general procedure listed in Example 1 (EX-1E) was followed for the hydrogenation of Preparatory Example 2 (PE-2) aminated SBS starting material. A catalyst loading of 3% relative to residual C═C was used. >98% conversion of backbone unsaturation was achieved and characterized by $^1$H-NMR analysis.

Example 3: Hydrogenation of Aminomethylated (1,4-b-1,2-b-1,4)-Poly(butadiene) with Homogeneous Catalyst (Wilkinson's)

Aminomethylated polymer (Preparatory Example 10, 60.0 g) was dissolved in cyclohexane (450 mL) and ethanol (120 mL) prior to being introduced to a Parr stainless steel autoclave. The solution was placed under a hydrogen atmosphere via three cycles of pressurization (200 psi. 1.4 MPa) and venting with hydrogen gas. Once a hydrogen atmosphere had been established, $(PPh_3)_3RhCl$ (5.0 g, 5.4 mmol) was added as a solid. The reactor was then pressurized to 650 psi (4.5 MPa) before heating was initiated. The reaction was heated to 80° C. for 36 hours. Hydrogen was periodically added to keep the pressure of the reaction within 50 psi (0.34 MPa) of 800 psi (5.5 MPa).

Once the reactor was cooled and vented, the deep red material was precipitated from acetone (~1 L) to give a rubbery light red solid. Polymer was further purified from precipitation from warm (60° C.) toluene and acetone (~3:1 acetone/toluene). $^1$H-NMR studies (CDCl$_3$) showed >99% hydrogenation of backbone C═C bonds present in the precursor aminated polymer, PE-10.

Example 4: Hydrogenation of Aminomethylated Polystyrene-b-(1,2-Polybutadiene)-b-Polystyrene Triblock Copolymer With Homogeneous Catalyst (Wilkinson's)

The reaction product of PE-11 (55.0 g) was dissolved in cyclohexane (400 mL) and ethanol (100 mL). The polymer solution was added to a 2 L Parr reactor and purged with Ar for 30 minutes. Once an inert atmosphere had been established, $(PPh_3)_3RhCl$ (0.65 g, 0.702 mmol, 1.0% relative to original 1,4-C═C in PE-7) was quickly added as a solid under Ar counter-flow. The reactor was then sealed and the contents were placed under a hydrogen atmosphere via three cycles of pressurization (200 psi, 1.4 MPa) and venting with hydrogen gas. The reactor was then pressurized to 500 psi (3.5 MPa) before heating was initiated. The reaction was heated to 50° C. for 36 hours. Hydrogen was periodically added to keep the pressure of the reaction within 50 psi (0.34 MPa) of 500 psi (3.5 MPa).

Once the reactor was cooled and vented, the deep red gelatinous material was precipitated from methanol (~1 L) to give a rubbery light orange solid. Polymer was further purified from precipitation from THF and methanol (~3:1 methanol/THF) to yield an off-white solid. $^1$H-NMR studies (CDCl$_3$) showed >98% total conversion of the original butadiene repeat unit unsaturation present in PE-7.

Example 5: Hydrogenation of Aminomethylated Polystyrene-b-(1,4-Polybutadiene)-b-(1,2-Polybutadiene)-b-(1,4-Polybutadiene)-b-Polystyrene Pentablock Polymer with Homogeneous Catalyst (Wilkinson's)

The hydrogenation of Preparatory Example 12 (PE-12A, PE-12B, and PE-12C) was completed without isolation of the aminomethylated polymer. A representative example for the synthesis of EX-5A follows. EX-5B and EX-5C were prepared in an analogous manner with proportional amounts of catalyst and PE-12B or PE-12C used as a precursor polymer. This example demonstrates the ability to complete aminomethylation and hydrogenation with a second, added catalyst in a single reactor without isolation of the aminomethylated, pre-hydrogenated intermediate.

After the aminomethylation and hydrogen treatment had been completed as described in Preparatory Example 12A, the reactor was attached to a line supplying Ar. Under positive Ar counter-flow, the reactor lid was removed and (PPh$_3$)$_3$RhCl (2.3 g, 2.5 mmol) was added as a solid. The reactor was then sealed and the contents were placed under a hydrogen atmosphere via three cycles of pressurization (200 psi, 1.4 MPa) and venting with hydrogen gas. The reactor was then pressurized to 500 psi (3.5 MPa) before heating was initiated. The reaction was heated to 50° C. for 36 hours. Hydrogen was periodically added to keep the pressure of the reaction within 50 psi (0.34 MPa) of 500 psi (3.5 MPa).

Once the reactor was cooled and vented, the deep red gelatinous material was precipitated from acetone (~1 L) to give a rubbery light orange solid. Polymer was further purified from precipitation from warm (60° C.) toluene and acetone (~3:1 acetone/toluene) to yield an off-white solid. $^1$H-NMR studies (CDCl$_3$) showed >94% total conversion of the original butadiene repeat unit unsaturation present in PE-8A. Conversions of 92% and 97% were observed for EX-5B and EX-5C, respectively.

Example 6: Hydrogenation of Aminomethylated Polystyrene-b-(1,4-Polybutadiene)-b-(1,2-Polybutadiene)-b-Polystyrene Tetrablock Polymer with Homogeneous Catalyst (Wilkinson's)

The reaction product of PE-13 (68.0 g) was dissolved in cyclohexane (400 mL) and ethanol (100 mL). The polymer solution was added to a 2 L Parr reactor and purged with Ar for 30 minutes. Once an inert atmosphere had been established, (PPh$_3$)$_3$RhCl (2.8 g, 3.03 mmol, 1.0% relative to original 1,4-C=C in PE-9) was quickly added as a solid under Ar counter-flow. The reactor was then sealed and the contents were placed under a hydrogen atmosphere via three cycles of pressurization (200 psi, 1.4 MPa) and venting with hydrogen gas. The reactor was then pressurized to 500 psi (3.5 MPa) before heating was initiated. The reaction was heated to 50° C. for 36 hours. Hydrogen was periodically added to keep the pressure of the reaction within 50 psi (0.34 MPa) of 500 psi (3.5 MPa).

Once the reactor was cooled and vented, the deep red gelatinous material was precipitated from acetone (~1 L) to give a rubbery light orange solid. Polymer was further purified from precipitation from warm (60° C.) toluene and acetone (~3:1 acetone/toluene) to yield an off-white solid. $^1$H-NMR studies (CDCl$_3$) showed >96% total conversion of the original butadiene repeat unit unsaturation present in PE-13.

Example 7: Quaternization of EX-1E and EX-2 with Methyl Iodide

In a typical experiment, the product of the hydrogenation reaction described above (EX-1E and EX-2) was dissolved in toluene (approximately 15 wt %). Methyl iodide (2 equivalents per nitrogen) was then added, and the reaction heated in a sealed container at 50° C. overnight (approximately 14 hours). After 6 hours, the reaction had vitrified into a solid block. Once the reaction was complete, petroleum ether was added and the solid was broken up and collected by filtration. After drying under high vacuum, a brittle grey solid was obtained. The product did not dissolve in cyclohexane, toluene, chloroform, methanol, ethanol, or isopropanol.

Example 8: Quaternization of EX-3 with Methyl Iodide

EX-3 (40.0 g, 120 mmol N) was added to a glass pressure vessel with TCE (250 mL). The vessel was capped, and polymer was stirred at 80° C. until completely dissolved. The solution was cooled before adding methyl iodide (16 mL, 257 mmol). The vessel was sealed and heated at 100° C. for 14 hours. The resulting solid was then triturated with acetone (~400 mL) and collected by filtration.

Example 9: Quaternization of EX-5 with Methyl Iodide

Casting solutions of xylene and EX-5A, EX 5B, or EX 5C (30% wt. solution) were prepared by dissolving the polymer at 50° C. The solution was cast onto a release liner (LOPAREX CL7300) and leveled with a 20 mil notch-bar. The film was then placed in a drying over for 2 hours at 80° C. followed by 2 hours at 130° C. Once cooled, the solid film could be readily removed from the release liner. The isolated film was then placed in an acetonitrile solution of methyl iodide (~100 mL solution for 48 in$^2$ membrane, 5-fold excess of methyl iodide relative to amine) and gently agitated for 24 hours. The film was then removed from the solution and washed with deionized water before being allowed to dry under ambient conditions.

TABLE 13

Membrane characterization for EX-9

|  | Linear Swell (%) OH$^-$ Form | Linear Swell (%) Cl$^-$ Form | σ (mS/cm) |
|---|---|---|---|
| EX-9A | 32 ± 1 | 20 ± 2 | 54.4 ± 2.1 |
| EX-9B | 27 ± 1 | 11 ± 2 | 62.7 ± 1.2 |
| EX-9C | 53 ± 2 | 28 ± 1 | 41.7 ± 14.4 |

Example 10: Formation and Characterization of Membrane from EX-7

A 30% wt. solution of EX-7 in DMF was prepared. The solution was cast onto a release liner (LOPAREX CL7300)

and leveled with a 20 mil notch-bar. The film was then placed in a drying over for 2 hours at 80° C. followed by 90 minutes at 130° C. Once cooled, the solid film could be readily removed from the release liner. The water uptake of the membrane formed was 269 wt % in the chloride form and 516 wt % in the hydroxide form. The linear swell was 55% in the chloride form and 82% in the hydroxide form. Ion conductivity of the hydroxide form was measured to be 0.054 S/cm.

Example 11: Formation of Membrane and Characterization from EX-8

A 15% wt. solution of EX-8 in TCE/DMSO (1:1) was prepared at 80° C. The solution was cast onto a release liner (LOPAREX CL7300) and leveled with a 30 mil notch-bar. The film was then placed in a drying over for 2 hours at 90° C. followed by 2 hours at 130° C. Once cooled, the solid film could be readily removed from the release liner. The water uptake of the membrane formed was 53 wt % in the chloride form and 195 wt % in the hydroxide form. The linear swell was 21% in the chloride form and 51% in the hydroxide form. Ion conductivity of the hydroxide form was measured to be 0.057 S/cm. Membrane testing in carbon dioxide electrolysis cell showed low and stable cell voltage of 3.00 V for 100 hrs with 99% CO product selectivity at 160 mA/cm2 current load at room temperature.

What is claimed is:

1. A method of making a hydrogenated nitrogen-containing copolymer, the method comprising:
    obtaining or providing a precursor copolymer that is a polymerized product of a monomer composition comprising butadiene, wherein the precursor copolymer is a random or block copolymer comprising
      1) A hydrocarbon backbone, wherein the hydrocarbon backbone has carbon-carbon double bonds;
      2) Unsaturated pendant groups *—CH=CH$_2$ attached to the hydrocarbon backbone, wherein the asterisk denotes the attachment site of the pendant group to the hydrocarbon backbone; and
    hydroformylating and reductively aminating the precursor copolymer in the presence of at least one transition metal catalyst to provide a first aminated copolymer, wherein the first aminated copolymer comprises
      1) A hydrocarbon backbone, wherein the hydrocarbon backbone has carbon-carbon double bonds;
      2) Nitrogen-containing pendant groups attached to the hydrocarbon backbone, the nitrogen-containing pendant groups being of Formula (IA) and Formula (IB)

*—CH$_2$CH$_2$CH$_2$—NR$^1$R$^2$ (IA) 

*—CH(CH$_3$)—CH$_2$—NR$^1$R$^2$ (IB) 

wherein
      a) R$^1$ is hydrogen or alkyl and R$^2$ is an alkyl; or
      b) R$^1$ and R$^2$ together with the nitrogen to which they are both attached form a heterocyclic ring that is saturated, the heterocyclic ring optionally further comprising an oxygen heteroatom;
      wherein the molar ratio of pendant groups of Formula (IA) to pendant groups of Formula (IB) is at least 6; and
    subsequently adding a hydrogenation catalyst and hydrogenating the first aminated copolymer in the presence of the hydrogenation catalyst to provide the hydrogenated nitrogen-containing copolymer having pendant nitrogen-containing groups of Formula (IA) and (IB).

2. The method of claim 1, wherein the precursor copolymer comprises repeat units having the unsaturated pendant groups in an amount of 5 to 40 mole percent based on total moles of repeat units in the precursor copolymer.

3. The method of claim 1, wherein the precursor copolymer further comprises styrene-type repeat units comprising styrene repeat units, methyl styrene repeat units, t-butyl styrene repeat units, or a mixture thereof.

4. The method of claim 1, wherein hydroformylating and reductively aminating the precursor copolymer comprises:
    forming a reaction mixture comprising:
      the precursor copolymer dissolved in an organic solvent;
      an amine compound of formula NHR$^1$R$^2$, wherein:
        a) R$^1$ is hydrogen or alkyl and R$^2$ is an alkyl; or
        b) R$^1$ and R$^2$ together with the nitrogen to which they are both attached form a heterocyclic ring that is saturated, the heterocyclic ring optionally further comprising an oxygen heteroatom;
      the at least one transition metal catalyst;
      an optional phosphine compound; and
    exposing the reaction mixture to a gaseous mixture of carbon monoxide and hydrogen.

5. The method of claim 1, wherein the at least one transition metal catalyst is a ruthenium catalyst and/or a rhodium catalyst.

6. The method of claim 4, wherein the phosphine compound is of the Formula (III)

(III)

wherein
    R$^{13}$ and R$^{11}$ is each independently an alkyl or aryl; and
    R$^{12}$ is an aryl or an aryl substituted with at least one alkyl or alkoxy group.

7. The method of claim 1, wherein no more than 20 mole percent of the carbons in the hydrocarbon backbone are in double bonds.

8. The method of claim 1, wherein the method further comprises reacting the hydrogenated nitrogen-containing copolymer with an alkylating agent to form a cationic copolymer having pendant quaternary amino groups of Formula (IIA) and (IIB)

*—CH$_2$CH$_2$CH$_2$—(NR$^3$R$^4$R$^5$)$^+$ (IIA) 

*—CH(CH$_3$)—CH$_2$—(NR$^3$R$^4$R$^5$)$^+$ (IIB) 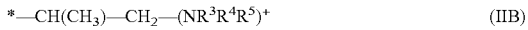

wherein
    R$^3$ and R$^4$ are each an alkyl or R$^3$ and R$^4$ together with the nitrogen to which they are both attached form a heterocyclic ring that is saturated, the heterocyclic ring optionally further comprising an oxygen heteroatom;
    R$^5$ is an alkyl, a multi-cationic group of formula —R$^6$—[(N(R$^7$)$_2$$^+$—R$^6$]$_q$—[N(R$^8$)$_2$R$^9$]$^+$, or a multi-cationic group of formula —R$^6$—[N(R$^7$)$_2$$^+$—R$^6$]$_q$—[X$^1$(R$^{10}$)$_2$]$^+$;
    each R$^6$ is independently an alkylene;
    each R$^7$ is independently an alkyl;
    each R$^8$ is alkyl or both R$^8$ groups combine together with the nitrogen to which they are both attached to form a heterocyclic ring that is saturated, the heterocyclic ring optionally further comprising an oxygen heteroatom;

$R^9$ is an alkyl;

$X^1$ is CH or N;

both $R^{10}$ groups together with $X^1$ to which they are both attached form a heterocyclic ring that is saturated or unsaturated, wherein the heterocyclic ring further comprises a quaternary amino group;

q is an integer in a range of 0 to 3;

the molar ratio of pendant groups of Formula (IIA) to pendant groups of Formula (IIB) is at least 6; and each cationic group has an anionic counterion.

9. A hydrogenated nitrogen-containing copolymer prepared by the method of claim 1, the hydrogenated nitrogen-containing copolymer comprising:

1) A hydrocarbon backbone, wherein no more than 20 mole percent of the carbons in the hydrocarbon backbone are in double bonds; and 2) Pendant groups attached to the hydrocarbon backbone of Formula (IA) and Formula (IB)

$$*-CH_2CH_2CH_2-NR^1R^2 \quad (IA)$$

$$*-CH(CH_3)-CH_2-NR^1R^2 \quad (IB)$$

wherein a) $R^1$ is hydrogen or alkyl and $R^2$ is an alkyl; or b) $R^1$ and $R^2$ together with the nitrogen to which they are both attached form a heterocyclic ring having 0 to 2 additional heteroatoms selected from nitrogen or oxygen, wherein the molar ratio of pendant groups of Formula (IA) to pendant groups of Formula (IB) is at least 6.

10. The hydrogenated nitrogen-containing copolymer of claim 9, wherein 2 to 20 mole percent of the carbon atoms in the hydrocarbon backbone have an attached pendant group of Formula (IA) or Formula (IB).

11. A cationic copolymer prepared by the method of claim 8, the cationic copolymer comprising:

1) A hydrocarbon backbone, wherein no more than 20 mole percent of the carbons in the hydrocarbon backbone are in double bonds; and 2) Pendant groups attached to the hydrocarbon backbone of Formula (IIA) and Formula (IIB)

$$*-CH_2CH_2CH_2-(NR^3R^4R^5)^+ \quad (IIA)$$

$$*-CH(CH_3)-CH_2-(NR^3R^4R^5)^+ \quad (IIB)$$

wherein $R^3$ and $R^4$ are each an alkyl or $R^3$ and $R^4$ together with the nitrogen to which they are both attached form a heterocyclic ring that is saturated, the heterocyclic ring optionally further comprising an oxygen heteroatom;

$R^5$ is an alkyl, a multi-cationic group of formula $-R^6-[(N(R^7)_2{}^+-R^6]_q-[N(R^8)_2R^9]^+$, or a multi-cationic group of formula $-R^6-[N(R^7)_2{}^+-R^6]_q-[X^1(R^{10})_2]^+$;

each $R^6$ is independently an alkylene;

each $R^7$ is independently an alkyl;

each $R^8$ is alkyl or both $R^8$ groups combine together with the nitrogen to which they are both attached to form a heterocyclic ring that is saturated, the heterocyclic ring optionally further comprising an oxygen heteroatom;

$R^9$ is an alkyl;

$X^1$ is CH or N;

both $R^{10}$ groups together with $X^1$ to which they are both attached form a heterocyclic ring that is saturated or unsaturated, wherein the heterocyclic ring further comprises a quaternary amino group;

q is an integer in a range of 0 to 3;

the molar ratio of pendant groups of Formula (IIA) to pendant groups of Formula (IIB) is at least 6; and each cationic group has an anionic counterion.

12. The cationic copolymer of claim 11, wherein 2 to 20 mole percent of the carbon atoms in the hydrocarbon backbone have an attached pendant group of Formula (IIA) or Formula (IIB).

13. A membrane comprising the cationic polymer of claim 11, wherein the membrane has a positive charge density in a range of 1 to 5 milliequivalents per gram of the cationic copolymer.

14. The membrane of claim 13, wherein the membrane further comprises reinforcement material.

15. An electrochemical device comprising:

an anode;

a cathode;

and a membrane positioned between the anode and cathode, wherein the membrane is according to claim 13.

* * * * *

UNITED STATES PATENT AND TRADEMARK OFFICE
CERTIFICATE OF CORRECTION

| | | |
|---|---|---|
| PATENT NO. | : 11,702,486 B2 | Page 1 of 1 |
| APPLICATION NO. | : 16/980312 | |
| DATED | : July 18, 2023 | |
| INVENTOR(S) | : Carl A. Laskowski et al. | |

It is certified that error appears in the above-identified patent and that said Letters Patent is hereby corrected as shown below:

In the Specification

In the Government Rights paragraph, Line 22:
"with Government support under Contract No. DE-EE0000776"
Should read as:
-- with Government support under Contract No. DE-AR0000776 --.

Signed and Sealed this
Twenty-third Day of July, 2024

Katherine Kelly Vidal
*Director of the United States Patent and Trademark Office*